US007996888B2

(12) United States Patent
Asunmaa et al.

(10) Patent No.: US 7,996,888 B2
(45) Date of Patent: Aug. 9, 2011

(54) VIRTUAL IDENTITY APPARATUS AND METHOD FOR USING SAME

(75) Inventors: Petri Asunmaa, Espoo (FI); Robert Aarts, Espoo (FI); Timo Skytta, Hyvinkaa (FI); Thomas Reichler, Helsinki (FI)

(73) Assignee: Nokia Corporation, Espoo (FI)

( * ) Notice: Subject to any disclaimer, the term of this patent is extended or adjusted under 35 U.S.C. 154(b) by 1015 days.

(21) Appl. No.: 10/339,986

(22) Filed: Jan. 10, 2003

(65) Prior Publication Data

US 2003/0172090 A1    Sep. 11, 2003

Related U.S. Application Data

(60) Provisional application No. 60/347,571, filed on Jan. 11, 2002.

(51) Int. Cl.
*G06F 17/30* (2006.01)

(52) U.S. Cl. ............................................. 726/9

(58) Field of Classification Search .................. None
See application file for complete search history.

(56) References Cited

U.S. PATENT DOCUMENTS

| | | | |
|---|---|---|---|
| 4,247,759 A | 1/1981 | Yuris et al. |
| 4,529,870 A | 7/1985 | Chaum |
| 4,759,063 A | 7/1988 | Chaum |
| 4,759,064 A | 7/1988 | Chaum |
| 4,914,698 A | 4/1990 | Chaum |
| 4,996,711 A | 2/1991 | Chaum |
| 5,429,361 A | 7/1995 | Raven et al. |
| 5,493,614 A | 2/1996 | Chaum |
| 5,502,806 A | 3/1996 | Mahoney et al. |
| 5,559,312 A | 9/1996 | Lucero |
| 5,566,327 A | 10/1996 | Sehr |
| 5,590,197 A | 12/1996 | Chen et al. |
| 5,649,118 A * | 7/1997 | Carlisle et al. .................. 705/41 |
| 5,712,913 A | 1/1998 | Chaum |
| 5,724,520 A | 3/1998 | Goheen |
| 5,781,631 A | 7/1998 | Chaum |
| 5,790,677 A | 8/1998 | Fox et al. |
| 6,078,806 A | 6/2000 | Heinonen et al. |
| 6,101,477 A * | 8/2000 | Hohle et al. ..................... 705/1 |
| 6,169,890 B1 | 1/2001 | Vatanen |
| 6,173,209 B1 | 1/2001 | Laval et al. |

(Continued)

FOREIGN PATENT DOCUMENTS

EP    0172670    2/1986

(Continued)

OTHER PUBLICATIONS

Liberty Alliance Project, Liberty Architecture Overview, Version 1.0, Jul. 11, 2002.

(Continued)

*Primary Examiner* — David J Pearson
(74) *Attorney, Agent, or Firm* — Mintz, Levin, Cohn, Ferris, Glovsky, and Popeo, P.C.

(57) ABSTRACT

A system according to an embodiment of the invention provides a means whereby a user or user device may be authenticated by an identity provider. The authentication may provide a trust relationship between the user and a service provider. An IdentityCard, a virtual version of traditional ID cards seamlessly expands the end user's ID card experience and related services to a personal device, like a mobile station or a Personal Digital Assistant (PDA), as well as to the Web browser.

12 Claims, 7 Drawing Sheets

Overall Concept Of Identity

U.S. PATENT DOCUMENTS

| | | | |
|---|---|---|---|
| 6,366,893 B2 | 4/2002 | Hannula et al. | |
| 6,725,269 B1* | 4/2004 | Megiddo | 709/228 |
| 6,802,007 B1* | 10/2004 | Canelones et al. | 713/193 |
| 7,010,600 B1* | 3/2006 | Prasad et al. | 709/225 |
| 7,272,849 B2* | 9/2007 | Brown | 726/2 |
| 7,630,986 B1* | 12/2009 | Herz et al. | 1/1 |
| 2001/0011250 A1 | 8/2001 | Paltenghe et al. | |
| 2001/0021928 A1* | 9/2001 | Ludwig et al. | 705/67 |
| 2001/0027441 A1 | 10/2001 | Wankmueller | |
| 2001/0029485 A1* | 10/2001 | Brody et al. | 705/39 |
| 2001/0029496 A1* | 10/2001 | Otto et al. | 705/74 |
| 2001/0034837 A1 | 10/2001 | Kausik et al. | |
| 2001/0037312 A1 | 11/2001 | Gray et al. | |
| 2001/0037316 A1* | 11/2001 | Shiloh | 705/74 |
| 2001/0047334 A1* | 11/2001 | Nappe et al. | 705/41 |
| 2002/0046341 A1* | 4/2002 | Kazaks et al. | 713/182 |
| 2002/0147766 A1* | 10/2002 | Vanska et al. | 709/203 |
| 2002/0174073 A1* | 11/2002 | Nordman et al. | 705/64 |
| 2003/0172090 A1 | 9/2003 | Asunmaa et al. | |
| 2005/0246292 A1* | 11/2005 | Sarcanin | 705/67 |

FOREIGN PATENT DOCUMENTS

| | | |
|---|---|---|
| EP | 1075155 | 2/2001 |
| WO | WO-96/32700 A1 | 10/1996 |
| WO | WO 97/12344 | 4/1997 |
| WO | WO 99/16029 | 4/1999 |
| WO | WO 00/02407 | 1/2000 |
| WO | WO 00/67415 | 11/2000 |
| WO | WO 00/74406 | 12/2000 |
| WO | WO-00/74406 A1 | 12/2000 |
| WO | WO 01/99025 | 12/2001 |

OTHER PUBLICATIONS

Blunk et al., PPP Extensible Authentication Protocol (EAP), Request for Comments (RFC) 2284, Mar. 1998.

Kohl et al., "The Kerberos Network Authentication Service (V5)", Request for Comments (RFC) 1510, Sep. 1993.

W3C, Simple Object Access Protocol (SOAP) 1.1, W3C Note, May 8, 2000.

Fielding et al., "Hypertext Transfer Protocol—HTTP/1.1", Request for Comments (RFC) 2616, Jun. 1999.

Khare et al., "Upgrading to TLS Within HTTP/1.1", Request for Comments (RFC) 2817, May 2000.

Chaum et al., "Achieving Electronic Privacy", Scientific American, Aug. 1992, pp. 96-101.

Chaum et al., "A Secure and Privacy-Protecting Protocol for Transmitting Personal Information Between Organizations", Advances in Cryptology CRYPTO '86, LNCS 263, pp. 118-167, 1987.

Chaum, "Online Cash Checks", Advances in Cryptology EUROCRYPT '89.

W3C SOAP Version 1.2 Part 1: Messaging Framework (Second Edition). Apr. 27, 2007.

W3C SOAP Messages with Attachments, W3C Note Dec. 11, 2000.

D. Eastlake, "Electronic Commerce Modeling Language (ECML): Version 2 Requirements", RFC 3505, Mar. 2003.

Kent, et al., "Security Architecture for the Internet Protocol", RFC 2401, Nov. 1998.

SSL 3.0 Specification, Connected: An Internet Encyclopedia, retrieved from the Internet, <http://www.lincoln.edu/math/rmyrick/ComputerNetworks/InetReference/ssl-draft/3-SPEC.HTM>, Feb. 28, 2011.

Harkins et al., "The Internet Key Exchange (IKE)", RFC 2409, Nov. 1998.

Mitra et al., W3C, SOAP Version 1.2 Part 0: Primer (Second Edition), W3C Recommendation Apr. 27, 2007, retrieved from the Internet, <http://www.w3.org/TR/2007/REC-soap12-part0-20070427/>, Feb. 28, 2011.

Gudgin et al., W3C, SOAP Version 1.2 Part 1: Messaging Framework (Second Edition), W3C Recommendation Apr. 27, 2007, retrieved from the Internet, <http://www.w3.org/TR/2007/REC-soap12-part1-20070427>, Feb. 28, 2011.

Gudgin et al., W3C, SOAP Version 1.2 Part 2: Adjuncts (Second Edition), W3C Recommendation Apr. 27, 2007, retrieved from the Internet, <http://www.w3.org/TR/2007/REC-soap12-part2-20070427/>, Feb. 28, 2011.

Christensen et al., W3C, Web Services Description Language (WSDL) 1.1, W3C Note Mar. 15, 2001, retrieved from the Internet, <http://www.w3.org/TR/2001/NOTE-wsdl-20010315>, Feb. 28, 2011.

Cooper et al., "Internet X.509 Public Key Infrastructure: Certification Path Building", RFC 4158, Sep. 2005.

ISO 7816-3 Smart Card Standard: Part 3 : Electronic Signals and Transmission Protocols, retrieved from the Internet, <hftp://www.cardwerk.com/smartcards/smartcard_standard_ISO7816-3.aspx>, Feb. 28, 2011.

ISO/IEC 7816, retrieved from the Internet, <http://en.wikiedia.org/wiki/ISO/IEC_7816>, Feb. 28, 2011.

Wireless Transport Layer Security, retrieved from the Internet, <http://en.wikipedia.org/wiki/Wireless_Transport_Layer_Security>, Feb. 28, 2011.

3rd Generation Partnership Project; Technical Specification Group Core Network; 3GPP Generic User Profile; Stage 3; Network (Release 6), 3GPP TS 29.240, v0.1.0 , Sep. 2003.

* cited by examiner

FIG. 1  Identity System

Nymity

FIG. 3  Overall Concept Of Identity

FIG. 4  Identification And Authentication Concept

FIG. 5  Generic Architecture For Identity

VIRTUAL IDENTITY APPARATUS AND METHOD FOR USING SAME

CROSS REFERENCE TO RELATED APPLICATION

This application claims priority to provisional application under 35 U.S.C. 119(e) of U.S. Application No. 60/347,571 filed on Jan. 11, 2002.

BACKGROUND

This invention relates to authentication and identification. In particular the invention relates to, but is not limited to, a virtual identity card system to authenticate the identity of the user.

RELATED CONCEPTS AND SPECIFICATIONS

It is assumed that a reader is aware of the following concepts and specifications. Reference is made in various areas of this disclosure to Request For Comments (RFC) submissions. These may be search for and found by number at http://www.rfc-editor.org/rfcsearch.html.

Liberty Alliance Project

The Liberty Alliance Project is a business alliance formed to deliver and support an Identity solution for the Internet that enables single sign-on for consumers as well as business users in an open, federated way. The role of the Liberty Alliance Project is to support the development, deployment and evolution of an open, interoperable standard for network Identity. It will require collaboration on standards so that privacy, security, and trust are maintained. Specifications for Liberty Architecture and processes may be found at http://www.projectliberty.org/specs. The specification *Liberty Architecture Overview*, Version 1.0, Jul. 11, 2002 is hereby incorporated by reference.

Extensible Authentication Protocol (EAP), Internet Engineering Task Force [IETF]

Extensible Authentication Protocol is an extension to Point-to-Point Protocol (PPP). EAP is a general protocol for authentication that also supports multiple authentication methods, such as token cards, Kerberos, one-time passwords, Certificates, public key authentication and smart cards. IEEE 802.1x specifies how EAP should be encapsulated in LAN-frames.

In wireless communications using EAP, a user requests connection to a Wireless Local Area Network (WLAN) through an Access Point (AP), which then requests the Identity of the user and transmits that Identity to an authentication server such as Remote Authentication Dial-In User Service (RADIUS). The server asks the AP for proof of Identity, which the AP gets from the user and then sends back to the server to complete the authentication. EAP is defined by RFC 2284.

Kerberos (IETF)

Kerberos is a popular secret-key authentication system (ftp://ftp.isi.edu/in-notes/rfc1510.txt, kerberos WG (krb-wg) Charter). Key Distribution Center (KDC) In Kerberos, central Key Distribution Center servers share secret keys with their end users, corresponding to user passwords. When a login session is initiated, the end user's system contacts the KDC to obtain a Ticket-Granting Ticket (TGT), which it decrypts using the end user's password in order to obtain a TGT session key. When an end user wishes to authenticate to a particular user service, the end user's device contacts the KDC, using the TGT and its session key, and requests a service ticket to the desired user service; this process also yields a session key for use between the communicating peer systems. The end user's device then presents the service ticket to the user service, along with an Authenticator generated using the session key; given this information, the user service can verify the end user's authenticity.

Secret-Key Authentication Systems

The term secret-key describes a form of authentication, which generally relies on the sharing of a secret key between an end user and a trusted authentication server. In the context of Liberty, an end user would authenticate with a user service by proving to their Identity that they knew a shared secret. Kerberos is the most well known secret-key authentication system.

Electronic Commerce Modeling Language (ECML) [IETF]

ECML is a universal format for online commerce Web sites that contains customer information that is used for purchases made online, formatted through the use of XML tags. It is a standard way of transferring billing, shipping and payment information to merchant sites regardless of what site the customer is purchasing from. If order forms are standardized, the customer's information can be imported directly into the form from a digital wallet with the click of one button. This saves the customer from repeatedly filling out the same information on multiple order forms on multiple sites. ECML can be used in conjunction with Secure Sockets Layer (SSL) and Secure Electronic Transaction (SET). For more information on SET, see http://www.setco.org/ and U.S. Pat. No. 5,790,677 issued to Fox et al. on Aug. 4, 1998 and incorporated herein by reference.

SSL, S-HTTP, TLS, IPsec [IETF]

Transport Layer Security (TLS) (http://www.ietf.org/html.charters/tls-charter.html), its wireless variant WTLS as defined by the WAP Forum, and IP Security (Ipsec) (http://www.ietf.org/html.charters/ipsec-charter.html) are protocol definitions that enable distributed public-key authentication to be performed in both directions between end user and user service.

In common Web operational practice public-key authentication is used in only one direction, to authenticate a user service to an end user device this is used to established a TLS protected channel to transfer password data to authenticate end users to user services and to protect the privacy of other personal end user data that may be exchanged.

Secure Sockets Layer (SSL) and Secure HTTP (S-HTTP). Secure Sockets Layer is a common but non-standardized predecessor of the Transport Layer Security (TLS) standard. SSL release 3 supports mutual authentication where client and server are authenticated by their Certificates (see PKI). Releases 1 and 2 allow only authentication of the server. SSL is a protocol developed by Netscape for transmitting private documents via the Internet. SSL works by using a public key to encrypt data that's transferred over the SSL connection. Both Netscape Navigator and Internet Explorer support SSL, and many Web sites use the protocol to obtain confidential user information, such as credit card numbers. By convention, URLs that require an SSL connection start with https: instead of http:.

Another protocol for transmitting data securely over the World Wide Web is Secure HTTP (S-HTTP). Whereas SSL creates a secure connection between a client and a server, over which any amount of data can be sent securely, S-HTTP is designed to transmit individual messages securely. SSL and S-HTTP, therefore, can be seen as complementary rather than competing technologies. Both protocols have been approved by the Internet Engineering Task Force (IETF) as a standard.

Transport Layer Security (TLS) is a protocol that ensures privacy between communicating applications and their users on the Internet. When a server and client communicate, TLS ensures that no third party may eavesdrop or tamper with any message. TLS is the successor to the Secure Sockets Layer (SSL). TLS is composed of two layers: the TLS Record Protocol and the TLS Handshake Protocol. The TLS Record Protocol provides connection security with some encryption method such as the Data Encryption Standard (DES). The TLS Record Protocol can also be used without encryption. The TLS Handshake Protocol allows the server and client to authenticate each other and to negotiate an encryption algorithm and cryptographic keys before data is exchanged.

The TLS protocol is based on Netscape's SSL 3.0 protocol; however, TLS and SSL are not interoperable. The TLS protocol does contain a mechanism that allows TLS implementation to back down to SSL 3.0. The most recent browser versions support TLS. The TLS Working Group, established in 1996, continues to work on the TLS protocol and related applications.

IP Security (IPsec). Short for IP Security, a set of protocols developed by the IETF to support secure exchange of packets at the IP layer. IPsec has been deployed widely to implement.

Virtual Private Networks (VPNs). IPsec supports two encryption modes: Transport and Tunnel. Transport mode encrypts only the data portion (payload) of each packet, but leaves the header untouched. The more secure Tunnel mode encrypts both the header and the payload. On the receiving side, an IPSec-compliant device decrypts each packet. For IPsec to work, the sending and receiving devices must share a public key. This is accomplished through a protocol known as Internet Security Association and Key Management Protocol/Oakley (ISAKMP/Oakley) allows the receiver to obtain a public key and authenticate the sender using digital Certificates.

HTTP, HTTPS, and SOAP

Simple Object Access Protocol (SOAP) [W3C]. An XML envelope and data encoding technology used to communicate information and requests across the Web. It is typically considered the protocol used by Web Services. It is actually an envelope encapsulation format that can be used with lower level Web protocols such as HTTP and FTP (File Transfer Protocol). For more information, see the following, W3C Note: SOAP 1.1: http://www.w3.org/TR/SOAP/, W3C: SOAP 1.2: http:H/www.w3.org/TR/2001/WD-soap12-20010709/, W3 Note: SOAP Messages with Attachments: http://www.w3.org/TR/SOAP-attachments/.

Hypertext Transport Protocol (HTTP) is the primary protocol used by web browers to communicate with user services. IETF RFC2616 Hypertext Transfer Protocol—HTTP/1.1. R. Fielding, J. Gettys, J. Mogul, H. Frystyk, L. Masinter, P. Leach, T. Berners-Lee. June 1999. (Updated by RFC2817)

Secure Hypertext Transport Protocol (HTTPS) is a secure version of HTTP that uses Transport Layer Security. IETF RFC2817 Upgrading to TLS Within HTTP/1.1. R. Khare, S. Lawrence. May 2000. (Updates RFC2616)

Public Key Infrastructure (PKI). Public-key authentication systems are systems such as the X.509-based technologies being standardized for Internet purposes (PKIX Charter), or the wireless authentication facilities being standardized in the WAP Forum. In these systems, owners can hold their authentication private keys privately, without sharing them with other entities. Secure means are provided so that verifiers can obtain the corresponding public keys that are needed to verify authentications.

Standards Related to XML and Web Services

A service that uses Web protocols to provide a service to a program rather than a person. This requires the service to present its functionality in a way that is convenient for programs to consume and this usually involves the use of eXtensible Markup Language (XML) to encode the information the service produces and consumes. EXtensible Markup Language (XML) is a W3C technology for encoding information and documents for exchange over the Web. For more information, see http://www.w3.org/XML/.

Security Assertion Markup Language (SAML) [OASIS] is an XML-based security standard for exchanging authentication and authorization information. See http://www.oasis-open.org/committees/security/#documents.

eXtensible Access Control Markup Language (XACML) [OASIS] is an XML specification for expressing policies for information access over the Internet. See http://www.oasis-open.org/committees/xacml/index.shtml/.

Web Services Description Language (WSDL) [W3C] is a popular technology for describing the interface of a web service. See http://www.w3.org/TR/wsdl/.

Wireless Transport Layer Security (WTLS) (WAP Forum) is the security level for Wireless Application Protocol (WAP) applications. Based on Transport Layer Security (TLS) v1.0 (a security layer used in the Internet, equivalent to Secure Socket Layer 3.1), WTLS was developed to address the problematic issues surrounding mobile network devices—such as limited processing power and memory capacity, and low bandwidth—and to provide adequate authentication, data integrity, and privacy protection mechanisms.

The Wireless Identity Module (WIM) is a tamper-resistant device, which is used to enhance security of the implementation of the Security Layer and certain functions of the Application Layer. WIM functionality can be implemented on a smart card (ISO 7816). WIM can be used for the following operations, inter alia: Certificate and key related operations of WTLS, and digital signature.

Generic User Profile (GUP) (3GPP) is an activity in 3GPP with the target to standardize generic user profiles for the environment of mobile networks [GUP]. A Generic User Profile is described as the collection of data which is stored and managed by different entities such as the user device, the Home Environment, the Serving Network and Value Added Service Provider, which affects the way in which an individual user experiences services.

Mobile Electronic Transactions (MeT) defines how services can be built around the personal trusted device and how those services can be realized in the remote, local and personal environment. MeT is an initiative founded to establish a framework for secure mobile transactions. It extends existing industry standards and technology. For example MeT draws on WAP WTLS (Wireless Transport Layer Security), WIM (WAP Identity Module), WPKI (WAP Public Key Infrastructure) and Bluetooth wireless technology. For more information see (www.mobiletransaction.org) Mobey Forum (www-.mobey.org) discloses an example payment architecture for mobile commerce.

Everybody uses Identities already today in the form of cards for various purposes. A library card allows us to borrow books, with a supermarket card one can get reduction, with a frequent flyer card we collect miles and may step into the airlines lounge, a credit card is practical for any kind of payments, and a bus-card allows you to travel by bus to work the next 30 days.

Many are a closed network proprietary card systems. Some examples are:

Disney Enterprises, Inc. (Burbank, Calif.) uses a "Park Hopping" ticket card to not only provide admission to their theme parks but also to allow access to shorter lines—a "Fast-Pass" system. Information regarding such a system can be found in U.S. Pat. No. 6,173,209 issued to Laval et al. on Jan. 9, 2001. U.S. Pat. No. 5,502,806 issued to Mahoney et al. on Mar. 26, 1996, and U.S. Pat. No. 5,566,327 issued to Richard Sehr on Oct. 15, 1996, provide additional examples in the entertainment art.

Computerized theme park information management system utilizing partitioned smart cards and biometric verification is another example of a user having an electronic identification card in the entertainment area.

In the gaming area, a user may use a card to collect provide cashless playing of the machine U.S. Pat. No. 5,429,361 issued to Raven et al. on Jul. 4, 1995, and assigned to Bally Gaming International, Inc. (Las Vegas Nev.). U.S. Pat. No. 5,559,312 issued to James Lucero discloses a system that allows players to obtain playing credit update users' accounts with wins/losses played at one or more gaming machines and one or more casinos.

In the travel art, users may be issued tickets without the intervention of any ticket agent SELF-SERVICE PASSENGER TICKETING SYSTEM U.S. Pat. No. 4,247,759 issued to Yuris et al. on Jan. 27, 1981, and assigned to Cubic Western Data (San Diego, Calif.). U.S. Pat. No. 5,724,520 issued to Joel R. Goheen on Mar. 3, 1998, entitled ELECTRONIC TICKETING AND RESERVATION SYSTEM AND METHOD teaches using a plastic I.D. card that accesses a computer for validation purposes via a mobile airline communication system at the departure gate.

Each of the above examples illustrates use of identification cards or use in closed proprietary network systems. The user must carry multiple cards that in addition to credit cards, driver's license, shopping loyality cards and the like creates for a thick wallet. There have been movement toward a single card system. U.S. Ser. No. 09/599,704 filed on Jun. 22, 2000, describes a SYSTEM FOR UTILIZING A SINGLE CARD TO PROVIDE MULTIPLE SERVICES IN AN OPEN NETWORK ENVIRONMENT. The application was published on Dec. 27, 2001, as International Publication Number WO01/99025 A1 with applicant First Data Corporation. However, the user must still carry a card or token and environment is still a proprietary network.

Oberthur Card Systems provides a Smart Visa framework (http://www.oberthurcs.com) which still requires the user to use a card. International Publication WO 96/32700 published on Oct. 17, 1996 discloses IMPROVEMENTS IN OR RELATING TO ELECTRONIC WALLETS. However, they fail to describe a Mobile Wallet (M-Wallet) or wireless access to commerce using a mobile station and virtual Identity.

Assignee of the present application has co-pending applications dealing with electronic payment systems. Said applications are herein incorporated by reference. U.S. patent application Ser. No. 09/068,280 filed on Nov. 5, 1996, now U.S. Pat. No. 6,366,893 and International Publication Number WO 97/17678 published on May 15, 1997, disclose A SYSTEM, A METHOD AND AN APPARATUS FOR PERFORMING AN ELECTRIC PAYMENT TRANSACTION IN A TELECOMMUNICATION NETWORK. U.S. patent application Ser. No. 09/527,979 filed on Sep. 25, 1998, and International Publication Number WO 99/16029 published on Apr. 1, 1999, disclose an ELECTRONIC PAYMENT SYSTEM.

The Internet is used to share public information. Since it is an open system, it should not be used to share confidential information unless precautions are taken to protect the information by use of passwords, encryption and the like. Even so, if passwords are used, hackers can determine them. In the Internet, there are clients, e.g. personal computers, and servers which may be server computers running computer programs that cause the servers to provide services to the clients. Typically computer programs used at clients and servers assume that their users are honest about their identity. Some client/server applications rely on the client to restrict its activities to those, which it is allowed to do, with no other enforcement by the server. Both clients and servers are entities.

Some sites use firewalls to improve their network security. Unfortunately, firewalls are based on an assumption of security threats come from the outside, which is not always the case. Computer crime can be carried out by insiders who have access to such private networks that are connected to the Internet by firewalls, that is intranets. These insiders can listen to the data traffic and detect passwords of the other users. Using these illegally obtained passwords, an insider can access such services to which he would not normally have access. In other words, firewalls can restrict viruses from accidentally contaminating an intranet, but they do not generally provide any certainty of the true authenticity of a client or server. Strong authentication is highly desirable for transactions involving money, confidential data or both.

Users of the Internet may be concerned about security while using online services and otherwise participating in electronic and mobile commerce. Users fear that sensitive information about themselves such as credit card numbers, social security numbers, and other similar information may be compromised while buying goods or services through electronic and mobile commerce (also respectively referred to as e-comm and m-comm). These concerns result in reduce market for purchase of goods and services using e-comm or m-comm.

Currently, there are proxy servers located on the Internet, which may provide for anonymous Internet access. In particular, the proxy server prevents on-line merchants and other entities on the Internet from determining the identity of the user. On such proxy service is Anonymizer.com (San Diego, Calif.; www.anonymizer.com), which provides privacy protection, blocks Cookies, Java, JavaScript, and other tracking methods.

However, even with proxy servers, once a consumer has decided to make an on-line purchase, their anonymity is gone once their payment information or their shipping information is given to the merchant. Thus, there remains a need for a system allowing users to anonymously purchase goods and services over a network.

Virtunality, Inc. (www.virtunality.com) provides a way to enhance user activity on a large communication network, e.g., the Internet, by creating new users and enhancing the activity of existing users, through the creation of user-controlled, preferably customizable, virtual entities equipped with tools designed for effective interaction on the Internet.

Illustrative of art in anonymity is that of David Chaum (http://www.chaum.com) and DigiCash (New York, N.Y.). The reader is directed to U.S. Pat. Nos. 5,712,913; 5,781,631; 5,493,614; 4,996,711; 4,914,698; 4,759,064; 4,759,063; 4,529,870. Articles by David Chaum et al. are "*Achieving Electronic Privacy,*" D. Chaum, (invited) *Scientific American*, August 1992, pp. 96-101; "A Secure and Privacy-Protecting Protocol for Transmitting Personal Information Between Organizations," D. Chaum & J.-H. Evertse, *Advances in Cryptology CRYPTO* '86, A. M. Odlyzko (Ed.), Springer-Verlag, pp. 118-167; "*Online Cash Checks,*" D. Chaum, *Advances in Cryptology EUROCRYPT* '89, J. J. Quisquater & J. Vandewalle (Eds.), Springer-Verlag, pp. 288-293.

One way to improve the situation is to use dedicated authentication protocols and, if necessary, encryption protocols for verifying the authenticity of a party and for preventing unauthorized parties from obtaining access. In addition, these protocols can typically be used to verify the integrity of any information exchanged over a link so that a recipient can be certain that the data received have not been tampered with.

Most people already today carry a mobile phone, like they carry a wallet and keys. Hence it is a natural extension to use the mobile phone as a tool for users to identify themselves, to disclose some of their Private Data to various services, and to authorize services and other agents to do something. All this may be done such that the user's privacy is well protected and with a minimum amount of efforts (like typing and configuration) for the users, thus making the mobile phone a Personal Trusted Device (PTD).

Everybody uses Identities already today in form of cards for various purposes. A library card allows us to borrow books, with a supermarket card one can get reduction, with a frequent flyer card we collect miles and may step into the airlines lounge, a credit card is practical for any kind of payments, and a bus-card allows you to travel by bus to work the next 30 days.

The wireless use of a Subscriber Identity Module SIM is previously known in the context of lending a SIM from one mobile station to another mobile station. EP1075155 discloses an example of providing a wireless access to a SIM, in order to provide a user identity of a GSM device. One SIM can be alternately used by different GSM devices without physically transferring the SIM between these devices. This publication is referred to as an example on how a SIM can be accessed over a wireless link, although the SIM is shared by two mobile stations.

WO 00/02407 discloses an invention wherein a laptop PC, provided with a Wireless Local Area Network (WLAN) adapter and a Global System for Mobiles (GSM) card phone, may access WLAN networks and authenticate a user by utilizing a Subscriber Identity Module (SIM) card contained by the GSM card phone. Access to the local area network takes place e.g. with the aid of a LAN card in the terminal and to the GSM network with the aid of a GSM card phone, which in practice is a stripped telephone located e.g. in the laptop's expansion slot. In addition, a SIM is connected to the GSM card phone. In that publication, the SIM is used not only for authenticating in a GSM network, but for reliable authentication of a data terminal to a non-trusted data network, such as to a third-party Mobile Internet Protocol (MIP) network. The SIM is accessed using the SIM slot of the GSM card phone. In brief, the SIM is used for generating a correct response to a challenge originated from an Authentication Center (AuC) of the GSM network to which the SIM belongs. The response can only be correctly generated by the SIM that possesses a first shared secret or a secret key known or stored only by the SIM and the AuC.

Thus, there is a need for a virtual Identity, which may also be referred to as a personal IdentityCard brand device. With a personal IdentityCard you can confirm who you are.

Definitions are as follows. A NAT is a Network Address Translator. A CA is a Certificate Authority as used in the public key initiative (PKI). WIM is a wireless identity module. SIM is a Subscriber Identity Module. AAA is Authentication Authorization Accounting. VPN is virtual private network. CLI is Calling Line Identification or other identifier containing a telephone number. GGSN is a Gateway GPRS Support Node. AAAs is an AAA server. AAAp is an AAA proxy. ECML is electronic commerce modeling language.

SUMMARY

A system according to an embodiment of the invention provides a means whereby a user or user device may be authenticated by an identity provider. The authentication may provide a trust relationship between the user and a service provider. An IdentityCard is a virtual version of traditional ID cards seamlessly expands the end user's ID card experience and related services to a personal device, like a mobile station or a Personal Digital Assistant (PDA), as well as to the Web browser. Different IdentityCards may have different characteristics. Some IdentityCards may be used with various Service Providers, like the credit card for payment, others may be associated with a single Service Provider only. For instance, the frequent flyer card of an airline. Some IdentityCards may reveal the 'real' identity of a person, as the traditional Personal Identity Card does, others will keep the person rather anonym. For instance, the user of a payment card may be anonym towards the purchaser. In the proposed system IdentityCards are issued by Identity Providers. A user may have IdentityCards from various Identity Providers, for instance from his mobile network operator, his bank, the government, and others. The Identity Provider may assist the user in management of Private Data; may take care of user and service authentication, and may know or suggest what ID card to present to a particular service. The user has control and may decide what Private Data to disclose and what ID to present. Private Data encompasses basics, such as names and addresses, preferences (for things like languages, musics, sports, etc.), but also sensitive data such as credit card numbers and passwords. ID cards can also present authorizations for services to use operator facilities on behalf of the user, who remains anonymous to the service. This will greatly enhance the use of services, due to functionality provided by mobile network operators, like location-based services, notifications, or payments.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention, for which reference should be made to the appended claims.

DETAILED DESCRIPTION

Figure 1:
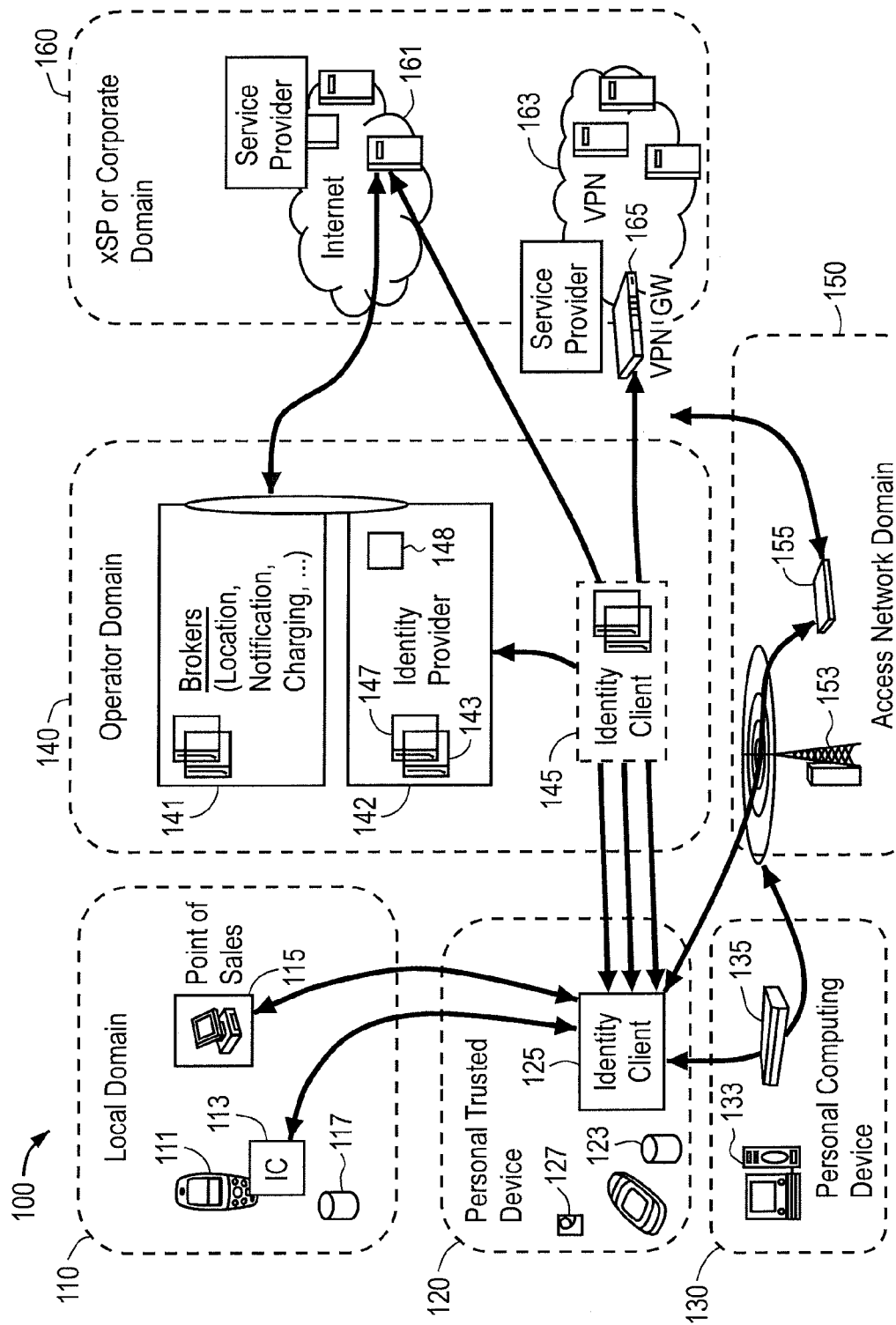
FIG. 1 shows elements of an identity system in accordance with an embodiment of the invention.

This document describes an overall concept, benefits, high-level requirements and architectures for a system that enables end-users, devices and other clients to easily and simply: identify themselves with an appropriate level of traceability and security; disclose some of their Private Data to various services in a controlled; confidentiality protecting manner so that personal service can be provided; authorize services and other agents to perform certain actions such as sending notifications, charging accounts, etc. All this is done protecting the client's privacy and avoiding needless reveal of the client's real Identity, and with a minimum amount of typing and configuration by the users.

The services mentioned above are to be seen in a broad sense; these may include applications on other nearby devices or they could be considered to include network access gateways such as VPN server, but as of today most services are web applications accessed by browsers.

The system will also provide the following functionality:
  Authentication of the client with the level of security satisfying the Service Providers' policy for the service access or for the committed transaction. If the security level already established by the client is not good enough, additional Credentials may be requested.
  Management and authorization tools ease the provisioning and the configuration of Private Data and terminal devices including the support for roles and groups of Identities.
  Development tools to facilitate smooth deployment of the system and to enable third party application development to utilize the system functionality easily.

In accordance with an embodiment of the present invention, mobile stations will become Personal Trusted Devices (PTDs) that end-users may always carry with them and that may be the primary means to control access to services, to control access to Private Data, and to pay for goods and services.

In general, the user primarily benefits from everything, which makes usage of existing services more convenient, overcomes serious problems with existing services like for instance lack of trust, or introduces promising new service concepts.

Identities and IdentityCards improve the convinience to use existing services. An important user benefit is that services can be personalized. This will happen, because private data may be presented without disclosure of the user's real identity (verinymity) and without bothersome filling of forms. The IdentityCard allows to security use Identities of existing service cards (like bank card, credit card, personal Identity card, miles card, or any affinity program card) through the personal device or any Internet browser. For instance the bank account may be accessible through both, the physical card and the IdentityCard.

An IdentityCard may for instance be used through the mobile phone. Credentials, like PIN or the user device, guarantee the same level of security as with existing service cards. For user convenience, both cards may even have the same PIN. To improve security, the usage of an IdentityCard might be restricted to a particular device, for instance the mobile phone. IdentityCards which are not critical in terms of security, might be usable without PIN. The application through which a user may manage and access his IdentityCards is called the Identity Client, or just wallet. A credential (e.g. PIN or password) may also be required to open the wallet (i.e. to make the IdentityCards visible and usable).

Username and password Identities may also be replaced by an IdentityCard. The IdentityCard can easily be selected with its logo on a GUI screen andf the like. The user does not need to type in card name or number.

By selecting an IdentityCard, the user may automatically be connected to the service, for example, your bank account; through the browser or another application.

The IdentityCard makes conventional cards much smarter due to display, keyboard, history log, and easy access to service administration. Single Sign-on (SSO) makes it possible to seemlessly switch over from one service to another, without a need to re-activate the IdentityCard. Identities and IdentityCards improves the degree of trust for existing services. When the IdentityCard is presented to a service for payment, the Identity system, for example Liberty based, will guarantee appropriate levels of security and privacy. The user can trust that key information like the credit card number will not end up in wrong hands, and that the service complies with certain privacy policies.

The concept of Identities and IdentityCards can only be successful, if it brings significant advantages for the Service Provider as well. First of all, the end user benefits are indirectly also benefits for the Service Provider. These and other benefits for the Service Provider are as follows:
  Secure usage of Identities from existing service cards.
  Same PIN for physical card and IdentityCard.
  Improved security with IdentityCard.
  Same IdentityCard concept also for user names.
  Visually select and click IdentityCard for service connect.
Security Significant Benefits:
  Identity concept guarantees adequate level for security and privacy.
  Identity usage automatically means appropriate level of security and privacy: Security due to the technical solution of Liberty; privacy due the Liberty privacy policies and due to the fact that private data may be presented anonymously or with a pseudonym that is not traceable by the Service Provider.
Improved User Trust Significant Benefits:
  If the IdentityCard is commonly associated as a trustworthy system ensuring high security and privacy.
  Builds on security and privacy provided by the system.
  Personalisation may be based on user data of IdentityCards that are used for multiple services, for instance the delivery address for payments.

The Identity system improves the value of signatures and transactions with pseudonym Identities, if the Identity Provider knows the real Identity (Verinymity) of the user.

The defined system enables multiple parties to authenticate users in a compatible manner creating the single sign-on user's experience towards services. In theory, this means that once the user has authenticated with an external Authenticator the verified Identity may be utilized to access also the mobile operators services if the mutual agreement between the Authenticator and the mobile operator is ratified. The user may associate also referred to as federate identities In this new situation the mobile operators are put in competitive situation with external Service Providers, if the Service Provider wants to take the Authenticator role.

Mobile operator as Authenticator and Identity Provider can give additional value to end-users and Service Providers by granting authorization tickets which enable the Service Providers or the communication parties to access related operator provided web services such as location, charging of content, notification and Private Data distribution. Additionally, mobile operators have the largest existing channel to distribute hardware-enforced smart cards (SIM) to end-users (IMSI) Identity may be used as such for many authentication needs.

SIM which include WIM functionality supporting digital signatures and (W)TLS client side authentication may build on the existing security association between mobile terminal and the operator Having control over services such as presence, notifications, charging give mobile operators advantages to become privacy brokers as a part of identity providing functionality by building and further enhancing protection of end users' identity and privacy.

Acting as an Identity Provider, mobile operator can strengthen customer relationships and start to provide new services to external Service Providers and corporations. As a result of increased respect of end-user's privacy and improved usability the system boosts the growth of service usage and mobile commerce.

Identity is a set of information that has been established by or for a Principal at an Identity Provider. It may contain a range of information (Private Data) and it may enable a range of end user personalized services. These services may be hosted by the Identity Provider or they may be hosted elsewhere. Identity may also be understood as the information belonging to an IdentityCard. The Identity enables services like instance payment.

IdentityCards are the virtual apparence of ID cards that we commonly use as some kind of Identities already today, for instance the bank account card, credit card, frequent flyer card, an affinity program card, the personal identity card, a card for library usage, SIM, WIM SWIMs, and others. The entire concept for Identities can be seen as a concept for IdentityCards that transfer the use concept and user experience with existing ID cards to electronic devices (PCD and PTD). In a long term IdentityCards are expected to replace many of the existing ID cards, but also to replace the usage of usernames and passwords with Internet services. Identity-Cards will not only copy the user experience; they will also greatly simplify service usage. In a way the PTD can be seen as an IdentityCard with a number of enhanced functionalities beyond traditional ID cards, enabled by a display, small keyboard, and device memory.

FIG. 1 shows elements of a system in accordance with an embodiment of the invention. The elements may be placed in various domains of Identity System 100. As an example, FIG. 1 shows a Local Domain 110, Personal Trusted Device (PTD) 120, Personal Computing Device 130, Operator Domain 140, Access Network Domain 150, and xSP or Corporate Domain 160. A Principle is an entity that gains one or several unique Identities ID's through the System and uses services provided and/or supported by the System. A Principal may be an individual, or a group of individuals, a company, or other logical entity. Synonyms for Principal are user or end-user.

Local Domain 110 may comprise a Point of Sales (POS) device 115 or a mobile station 111 such as a wireless phone having an Identity Client 113 having local storage 117. Local storage may be disk drive (optical and/or magnetic), RAM, Flash, and the like for storage of information. Mobile Station 111 may also have a Subscriber Identification Module (SIM) Identities may be used to support local transactions/services where terminal devices are communicating directly over local links such a Radio Frequency Identification (RFID), Bluetooth, 802.11, infrared (IR) or other means of local data transfer. A mobile Station 111 with Identity may place a transaction though a POS terminal 115, which may be a cash register, ticketing machine or POS verification units such as those manufactured by VeriFone, Inc. (Santa Clara, Calif.; www.verifone.com) or the 2Scoot™ system from Commerce Systems Inc. (Kingston, N.Y.; www.2scoot.com). In another embodiment, both devices may be Mobile Stations and Digital Cash may be transferred between the two devices.

U.S. Pat. No. 6,078,806 Heinonen et al. granted on Jun. 20, 2000, entitled METHOD FOR USING APPLICATIONS IN A MOBILE STATION, A MOBILE STATION AND A SYSTEM FOR EFFECTING PAYMENTS assigned to the same assignee of the present application and incorporated herein by reference. U.S. Pat. No. 6,078,806 provides a method of affecting payments using a mobile station including transferring Digital Cash between two mobile stations. The system includes interchangeable modules, which may be based on ISO 7816 standard such as a SIM with local memory and application firmware or software stored therein. The patent teaches that a mobile station can have application modules. One may be SIM issued by the service provider, while the identity modules may be issued by other authorities such as back certificate authorities, government authorities such as Homeland Security.

Figure 6:
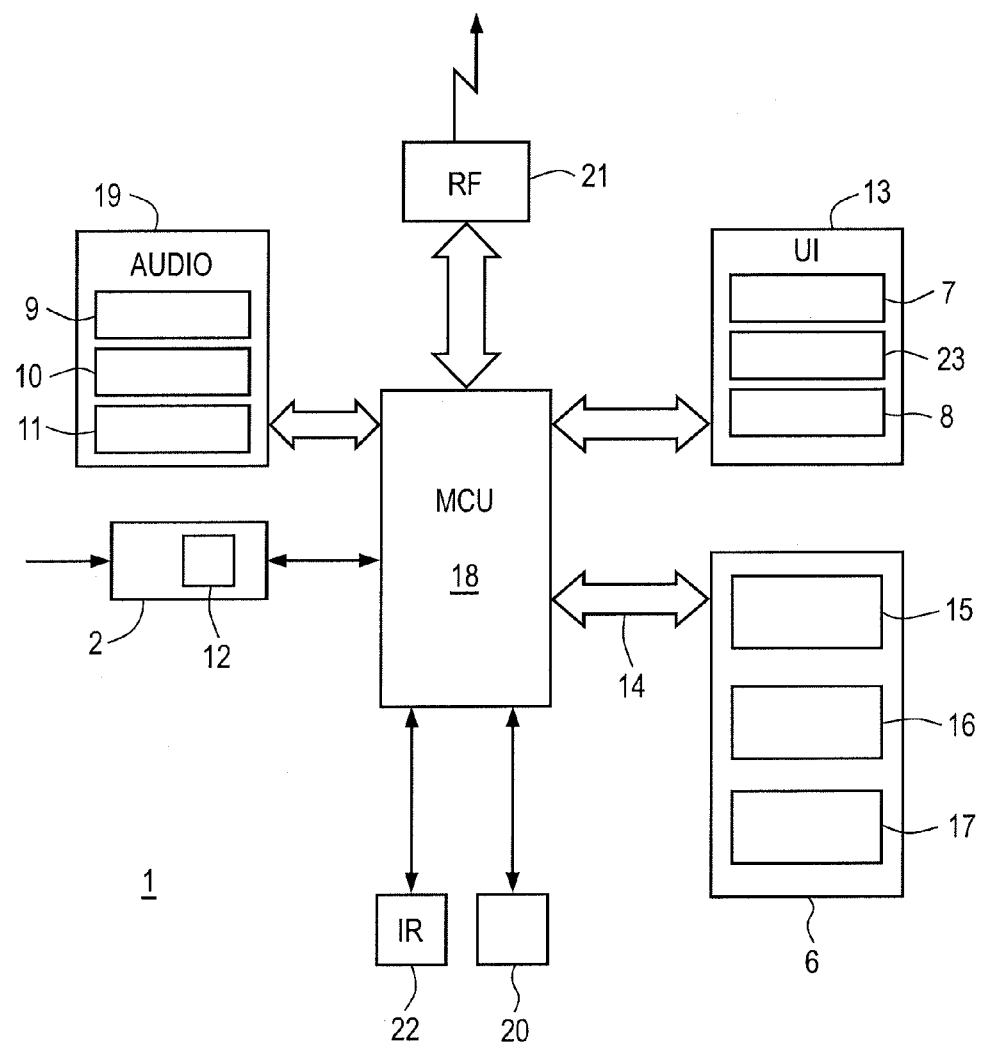
FIG. 6 shows a block diagram of a mobile station in accordance with an embodiment the present invention.
Figure 7:
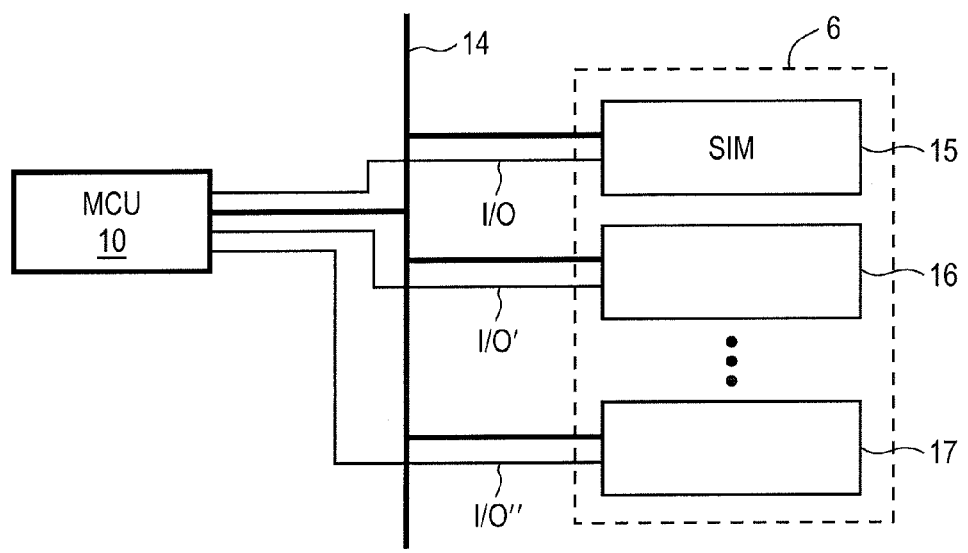
FIG. 7 shows the electric construction of an application module bus between the application module connection unit and CPU of a mobile station in accordance with the invention.

The mobile phone architecture to provide for multiple identity modules, shown in FIGS. 6 and 7. In FIG. 6, a card-controlled mobile station 1 comprises a master control unit MCU 18, a user interface UI 13, a high-frequency part RF 21, a low-frequency part AUDIO 19, a power unit 2, a IR port 22, and an application module connection unit 6. The operation of the mobile station 1 is controlled by the MCU 18, which has a program code stored in advance for performing different operations in accordance with the present invention.

The user interface UI 13 comprises components which are known from prior art mobile phones, namely a display 7, a keypad 8 and status indicators 23. The MCU produces various, situation-specific messages, operation instructions, menus etc. on the display 7. Using the keypad 8, the user can enter different kind of information to the mobile station 1, such as the identification number and telephone number, and select operations from the menus. The status indicators 23 can preferably be used to indicate the internal modes of operation of the mobile station 1.

The radio frequency component RF is a known component of mobile phones, which is used to transmit and receive calls and messages using radio frequencies in a radio communication network, such as a GSM network, e.g. through a mobile services switching centre, MSC.

The low-frequency part AUDIO preferably comprises a microphone 9, a headphone 10 and a buzzer 11 or the like.

The operation power for the mobile station 1 is supplied by a battery 12, which is charged when required. The power unit 2 monitors the charge status and charging procedure of the battery 12, among other things. The power unit 2 sends the information to the central unit MCU when the charge status of the battery 12 falls below a predetermined value, whereby the MCU announces this preferably by sounding the buzzer 11 and/or showing a message on the display 7.

FIG. 7 shows the coupling of a plurality of identification modules with the MCU 18. In addition to module bus 14, there is a separate control and data line I/O, I/O', I/O" from each application module connector 15, 16, 17, of the module connection unit 6. Thus it is possible to use a structure based on the standard series ISO 7816 in the control and data line. The standard series ISO 7816 includes the voltage levels and timing diagrams, according to which the identity modules are connected to the control and data line I/O, I/O', I/O".

A Personal Trusted Device (PTD) 120 is a device which has mechanisms that enable trust relationships between services and the user of the device. A PTD includes a mechanism for user verification, possibly an area for secure key storage and cryptographic processing, a certificate database and a transaction database. Because it is small, secure, personal, familiar and carried at all times, the mobile station is rapidly evolving into much more than a wireless phone. It is transforming into a Personal Trusted Device (PTD), with the ability to handle a wide variety of new services and applications, such as banking, payments, ticketing and secure access-based operations. Some Personal Trusted Devices include both a SIM and a Wallet or Wirelesss Identification Module (WIM) 127 which may be used to facilitate Mobile Commerce. Thus, the PTD acts as a physical security and authorization token to other devices, often over a local radio link like Bluetooth.

Users may also own multiple PTDs and embodiments of the present invention may provide support for terminal upgrade to newer models and support for backup and restoring of Private Data from the terminal to avoid loosing the clients most valuable data because of loss of the device or hardware failure. This may be provided by a synchronizing service.

Personal Computing Device 130 may be a Personal Computer (PC) 135 or a set-top box 135 providing digital services to a home. Personal Computing Device (PCD) may also be a device, which is mainly used by a single person, for instance a small mobile hand-held device like a mobile phone or a Personal Digital Assistant (PDA). Any PCD 130 may also include local storage such and disk drive (optical and/or magnetic, RAM, Flash, and the like for storage of information.

Operator Domain 140 may provide Brokers 141, Identity Provider 142 and an Identity Client 145. Identity Provider may be further comprised of Private Data Store 147, Identity Issuer 148 and Authenticator 143. In the Operator Domain, the operator may maintain an Identity client 147 for a user.

Access Network Domain 150 may provide for wireless access gateway though an Air Interface 153 and Gateway Server 155.

Corporate Domain 160 may comprise an internet Service Provider 161 or a Virtual Private Network (VPN) 163 with Gateway 165. Service Provider (xSP) in the context of an embodiment of the present invention is a Service Provider providing services that make use of Identities.

Referring to elements illustrated in FIG. 1 are Identity Provider 142 and various Identity Clients 113, 125, 145. As indicated by the name, the Identity Provider 142 provides the Identity and certain Identity related functionality, like for example authentication using Authenticator 143. Identity Clients represent functionality for Identity usage in the respective client devices. With legacy terminals, i.e. terminals with legacy WAP browser, functionality of the Identity Client may also be resided in the network. The usage of identities needs also to be considered at the Service Provider, as services need to be adapted to make use of Identities and Identity related features. The Identity System of the embodiment of the invention illustrated in FIG. 1 is flexible. Identity Provider functionality may be operated by Service Providers, corporations, or Mobile Operators. Even an Identity client may perform the major part of Identity Provider functionality. This is needed especially to support direct terminal-to-terminal communication. The fact that users' Private Data Stores are distributed over multiple locations may specifically be taken into account when providing the privacy control functionality.

Examples of services supported by embodiments of the invention include third party web services, authentication with intranet VPN access gateways, or authorizing and charging for access, e.g. to public Wireless Local Area Networks (WLAN) and the like.

On privacy policy, we mean rules that aim at eliminating (certain) privacy threats and which persons and hence the systems operated by the persons in question are obliged to obey. The difference between privacy technology and policy is that a privacy technology securely eliminates the threat i.e. it makes the threat technically impossible, whereas the success of a privacy policy depends on whether the persons obey the rules or not. The rules typically regulate the collection, storage and disclosure of information, especially personally identifiable information (PII), for example: what information is disclosed by the user or collected by the Service Provider, the purpose for which the information is collected, whether the scope of collected information matches the immediate purpose, whether the user can appear anonymously or only under a true name, or restrictions on use and/or subsequent distribution of the information.

Identity Sharing

Personalization and Privacy

Privacy is strongly related to personalization. They are actually two sides of the same coin. Personalization is a good thing: the service remembers me, its service fits my preferences and I have the overall feeling that the service is designed or tailored for me. But when it is "too personal", it becomes a privacy issue: the service reaches me when I wouldn't like, it knows too much about me, it sells information about me without my knowledge, etc. This is the point when we start talking about privacy threats and privacy concerns.

Uncontrolled use and distribution of personally identifiable information can easily lead to abuses. Common concerns related to privacy include the following threats: unsolicited marketing (spamming), traceability of user actions, linkability of personal data from different sources, discrimination between different users, errors due to inacurrate data, loss of control by user, and Identity theft.

Security and Privacy

Privacy is closely related to security, but is not the same. Security is protection against unauthorized access to information (including destruction or alteration as well). Privacy brings a new aspect to this, putting the emphasis onto information related to the persons' Identity.

In case of the policy approach, the user's feel of privacy greatly depends on whether they are able to trust the Service Provider's data security and compliance with the restrictions. Identity is a set of information about an entity that differentiates it from other, similar entities. The set of information may be as small as a single code, specifically designed as an identifier, or may be a compound of such data as given and family name, date-of-birth and postcode of residence. A practical definition of privacy can be given for the case that pure privacy technology is accompanied by a privacy policy:

A system is privacy-enabled if no party is able to or has the right to link data about a user to its Identity or its other data, unless the user has explicitly allowed it. It is desirable to incorporate privacy technology wherever possible, and policies/rules are to be used for eliminating all remaining privacy threats that technology cannot address.

Figure 2:
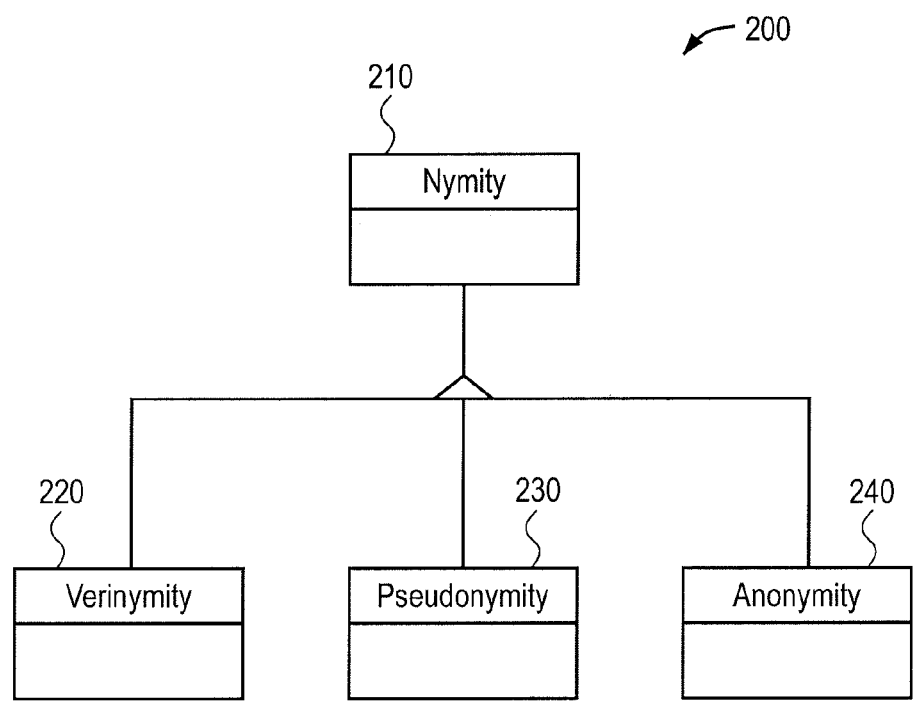
FIG. 2 shows a representation of the levels of Nymity.

FIG. 2 shows a representation 200 of the levels of Nymity 210. Nymity 210 is the extent to which Identity information disclosed during a session or transaction is linked to a true Identity of an entity. There are three Nymity levels: Verinymity 220, Pseudonymity 230, and Anonymity 240.

A verinym in the context of this document is an Identity, which may by its name or by associated Private Data be traced to the Principal. Generally, a piece of information is called verinym, if it can single you out of a crowd of potential candidates. For example, a credit card number is verinym. So can be a telephone number, a street address, or an email address.

A pseudonym is a persistent fictitious name. It is unique enough so that the communicating party can be distinguished from other parties but contains not enough information for identifying to the real person (Principal). A person can have several pseudonyms, establishing a different virtual person for different services. Persistency means that one pseudonym is typically used multiple times. On this basis, one party can remember the other party (and e.g. personalize its service). Login names at free Internet storage providers are pseudonyms.

The MCU 18 of FIGS. 1 and 2 may be designed or programmed to select the identity card with the proper level of Nimty if a physical card is used.

Finally in case of anonymity, no persistent name is used. An anonymous communicating party cannot be remembered. It is also known as unlinkable anonymity. Note that this can be true only on the Application Layer. On Connectivity Layer, an identifier (e.g. IP address) is still to be used for distinguishing from other parties, but then this identifier is thrown away (or is reused but then nobody expects that the same person uses it; i.e. this identifier is transient).

Disclosing a client's profile, or part of it, is an extremely critical operation. Special care must be taken of what part of the profile, to whom, for what purpose, for how long time, with what usage rights etc. is given out. Techniques like the authentication of the requester, determination of the purpose, signing of legally binding (digital) contracts support profile disclosure.

An important thing to mention here is triangulation. It means that two or more harmless and independent profile disclosures can represent a privacy risk if they can be linked. Imagine for example, that a client's postal zip code is disclosed in one session and the birth date in another session. Neither of the two data elements, in itself, tells too much. But if one knows that they belong to the same person, then the client's Identity can be found out given a demography database at hand. Another important thing to know is that a complicated enough Private Data, even if not containing direct Identity data, is a pseudonym. That is, if (the disclosed part of) a profile is individual enough, then it may serve as basis for linking. Because of this, special care has to be taken of what part of the profile is disclosed in a given situation. Principle of Minimum Profile Disclosure is used to address this threat. It basically states that one should never disclose more information than the absolute minimum needed to personalize or customize the service.

Figure 3:
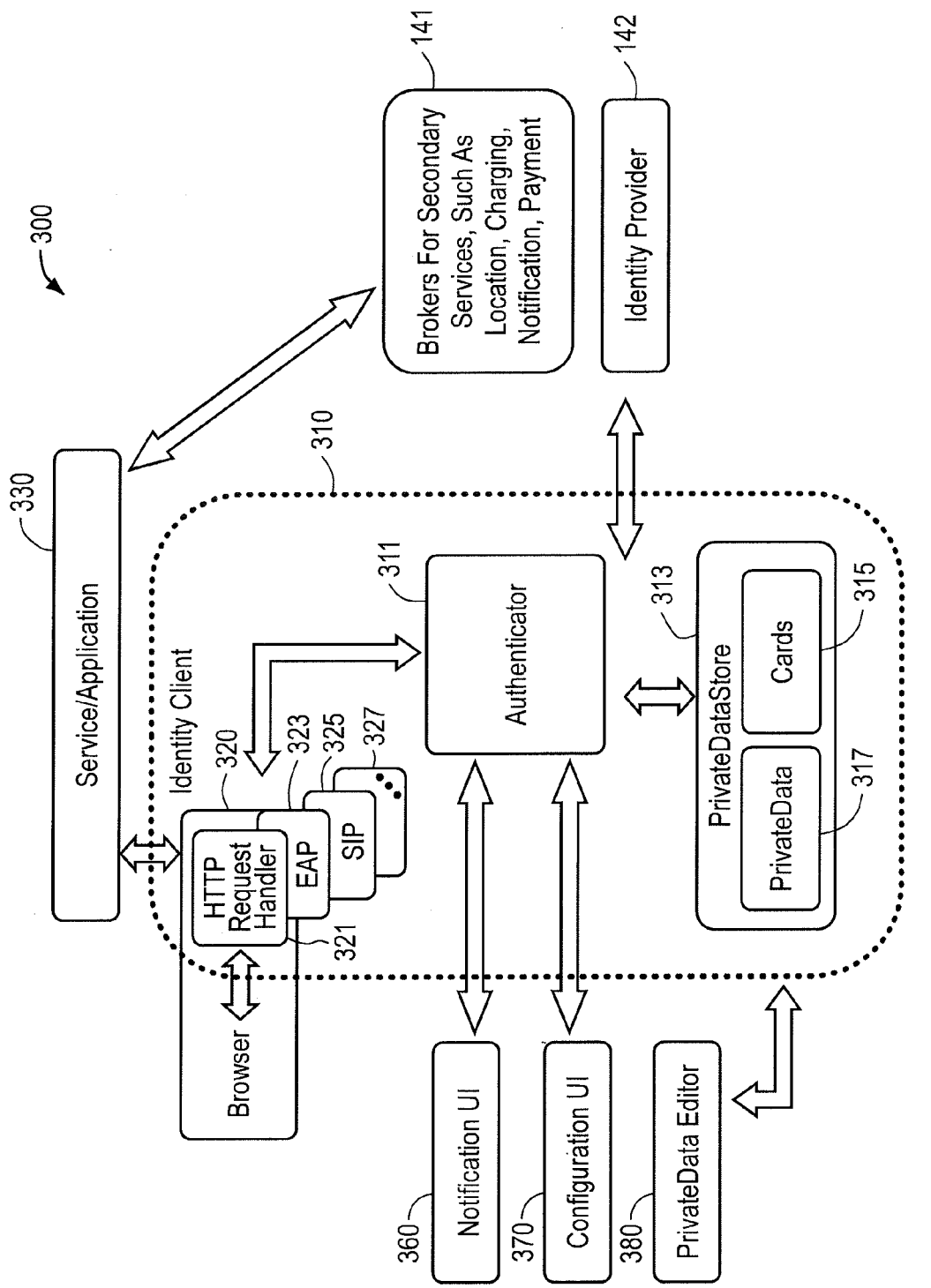
FIG. 3 shows the details of the concept of Identity with an example of Identity Client such as was shown in FIG. 1 in accordance with an embodiment of the invention.

FIG. 3 shows the details of the concept of Identity with an example of Identity Client such as was shown in FIG. 1 in accordance with an embodiment of the invention. An system in accordance with an embodiment of the present invention is presentation of an Identity Card to a service. Often, but not always, such a card may contain an ID and Credentials used to access the service. In many cases the card also presents some Private Data to the service, which can be used for personalization. Additionally, in some cases, the card may present some authorizations to the service.

Identity 300 of FIG. 3 comprises Identity Client further comprising Authenticator 311, PrivateData Store 313 with PrivateData 317 and Cards 315, Browser Interface 320 with various protocol handlers: HTTP Request Handler 321, Extensible Authentication Protocol (EAP) Handler 323, Session Initiation Protocol (SIP) Handler 325 and other handlers (...) 327. Identity 300 also comprises Service or application 330, Brokers for secondary services 340, Identity Provider 350, NotificationUI 360, ConfigurationUI 370, PrivateData Editor 380.

Authenticator 311 performs authentication assertion of the Identity that a principal is willing to use. This is done based on Credentials, for instance a password, presented by the user (Principal) or the user's device. The Authenticator is responsible for authentication of users, devices and services, and may optionally resided at the Identity Provider 142. For example, Authenticator 143 of Identity Provider 142 as shown in FIG. 1. The protocol handlers transform Identities into a format appropriate for the protocol. Protocols may for instance be HTTP 321 for WAP and Web access, EAP 323 for access to WLANs and VPN gateways, SIP 325 for SIP based services, PPP for access to internet access points, and PTP for access to other nearby devices.

Authorization is used as a term for: Firstly, Service Authorization, which is the process of giving the Principal access rights and privileges to services of a Service Provider (such as access to which file directories, hours of access, or amount of allocated storage space). Secondly, User Authorization, which expresses that the Principal authorizes a Service Provider to access services that are associated with an Identity. Examples for such services are the access of Private Data, or payment transactions.

Identity Provider 142 is an entity that performs the following tasks:
- issues Identities (Identity Issuer);
- offers services related to an Identity (e.g. forwarding Private Data to Service Provider); and
- may contain the functionality of Authenticator.

Identity Client 310 stores information about the Identities of a user (Principal). This information may be a link to the Identities or the entire Identities. Identity Client 310 takes care of Identity related interaction with the Service Provider, Identity Provider, and user. Identity Client may be resided in the user device or somewhere in the network and contains different protocol handlers and the Authenticator.

Mutual authentication may be required such as in the Liberty Alliance (www.projectLiberty.org), in which the Liberty solution requires mutual authentication between the actors: Principal, Identity Provider (and/or Authenticator), and Service Provider.

Where authentication is based on the use of Public-Key Infrastructures (PKIs), Certificates are used to present the Identity of a Principal. The Service Provider uses these Certificates to authenticate the Principal (e.g. using challenge-response method). The Service Provider may verify the validity of a Certificate through the Certification Authority (CA) that has issued this Certificate.

The term Credential may be used in two meanings: In an embodiment of the present invention, it may refer to secrets provided by a Principal in order to assert an Identity. Such secrets may be for instance a PIN or password. Sometimes, the term Credentials may refer to a secure token that a Principal obtains, as a result of an authentication. This secure token plays an important role in enabling SSO, since it represents the authenticated Identity of a Principal.

Authorizations are used by a service to use other services on behalf of the user. These "secondary" services include, but are not limited to, operator services for location, notification and charging. Other example uses for authorizations are payment, and updates of dynamic Private Data 317, such as an on-line calendar. Hence, authorizations allow for distribution of Private Data, as location and calendar data are good examples of Private Data that are unlikely to be co-located on the same machine. The Identity Client stores information about the Identities of a user (Principal). This information may be a link to the Identities or the entire Identities. The Identity Client takes care of Identity related interaction with the Service Provider, Identity Provider, and user. The Identity Client may be resided in the user device or somewhere in the network and contains different protocol handlers and the Authenticator. The Authenticator is responsible for authentication of users, devices and services, and may optionally resided at the Identity Provider. The protocol handlers transform Identities into a format appropriate for the protocol. Early implementations shall support HTTP for WAP and web access to personalized sites, but the architecture does also allow support of EAP for access to WLANs and VPN gateways, SIP for SIP based services, PPP for access to internet access points, and PTP for access to other nearby devices.

In the Personal Trusted Device (PTD), the client, Authenticator, and protocol handlers are integrated into the mobile station or PTD. To support millions of legacy mobile stations that do not have PTD functionality, a Mobile Operator may run the complete Identity Client on behalf of the mobile stations.

Before an Identity can be used, it has to be created. There may be three types of Identities: A Verinymity will be granted by Identity Issuers and will be used for higher value services, or for a number of business-wise related services. It is expected that users will only use a limited number of such Identities. For pseudonymous access to services with less stringent needs for user authentication, the Identity Provider may create Identities at the time the user chooses to "opt-in" to such services. Finally, the Identity Provider maintains generic anonymous Identities that reveal only some high-level user preferences, but no identifiable information, to compliant services. In all cases a user, or device, has to authenticate with the Authenticator. Only upon successful authentication will the client present Identities. Services will almost always have to authenticate with the Identity Provider before Identities will be presented. The client has to adhere to a set of privacy preferences, for example:

The user reviews and controls what Private Data is disclosed upon a first visit to a certain service.

The user can instruct the system to honor subsequent requests for the same data by the same service without interruption.

The user may specify "data sets" which are available without opt-in.

In any case the user is able to balance security and ease of use. Simultaneously, services that require strong authentication have the possibility to challenge the user through the universal Identity client user interface.

Further system requirements include the need to support user's owning multiple PTDs, need to support terminal upgrade to newer models and need to backup and restore Private Data from the terminal to avoid loosing the clients most valuable data because of loss of the device or hardware failure. All these require some sort of synchronizing service. The following sections describe some of the major issues that should be addressed and then presents some sketches of two different solutions.

There is a need to support various means of challenging the enduser, with passwords, SIM, WIM, or even biometrics. Importantly the strength of authentication used must be made available to services that trust the Identity Provider for end-user authentication.

There must be a way for the service to indicate that it wants to see some Identity (card), including specific details such as Credentials, pieces of Private Data and authorizations for certain type of broker services.

Once the client and Identity Provider have decided upon the Identity, the client should present the Identity to the service.

The Identity most often contains sensitive data, so should be protected from eavesdropping. Also, the information in the Identity should be understandable to the service, so widely accepted formats, or schema are needed.

It is important that the architecture enables high quality, effective, personal services, without a need for the user to reveal his real Identity. For example the use of a globally unique Identity is to be avoided as it becomes too easy to trace all activities of the user. Of course, in several cases it is important that the user can present a strongly authenticated Identity to a service, for example for payment and corporate access.

It is at least as important that a client can trust a service, as it is for the service to trust the client. Users will only disclose sensitive data if they can be reasonably certain that the service is both authentic as well as known to adhere to well-defined privacy policies.

There are various parties that could be an Identity Provider. It is important that users as well as services have a choice as to which providers they use. Some services will by their nature trust only certain Identity Providers and similarly users will prefer certain parties as Identity Providers. A global central Identity Provider is unlikely to succeed for market reasons, and not preferable for privacy reasons. The architecture overviews in the following sections do not claim to address all issues but rather give a feel for what such architectures could look like. Modification and variations made by those of skill in the art after reading the specification including the claims are deemed to be within the spirit and scope of the invention.

Figure 4:
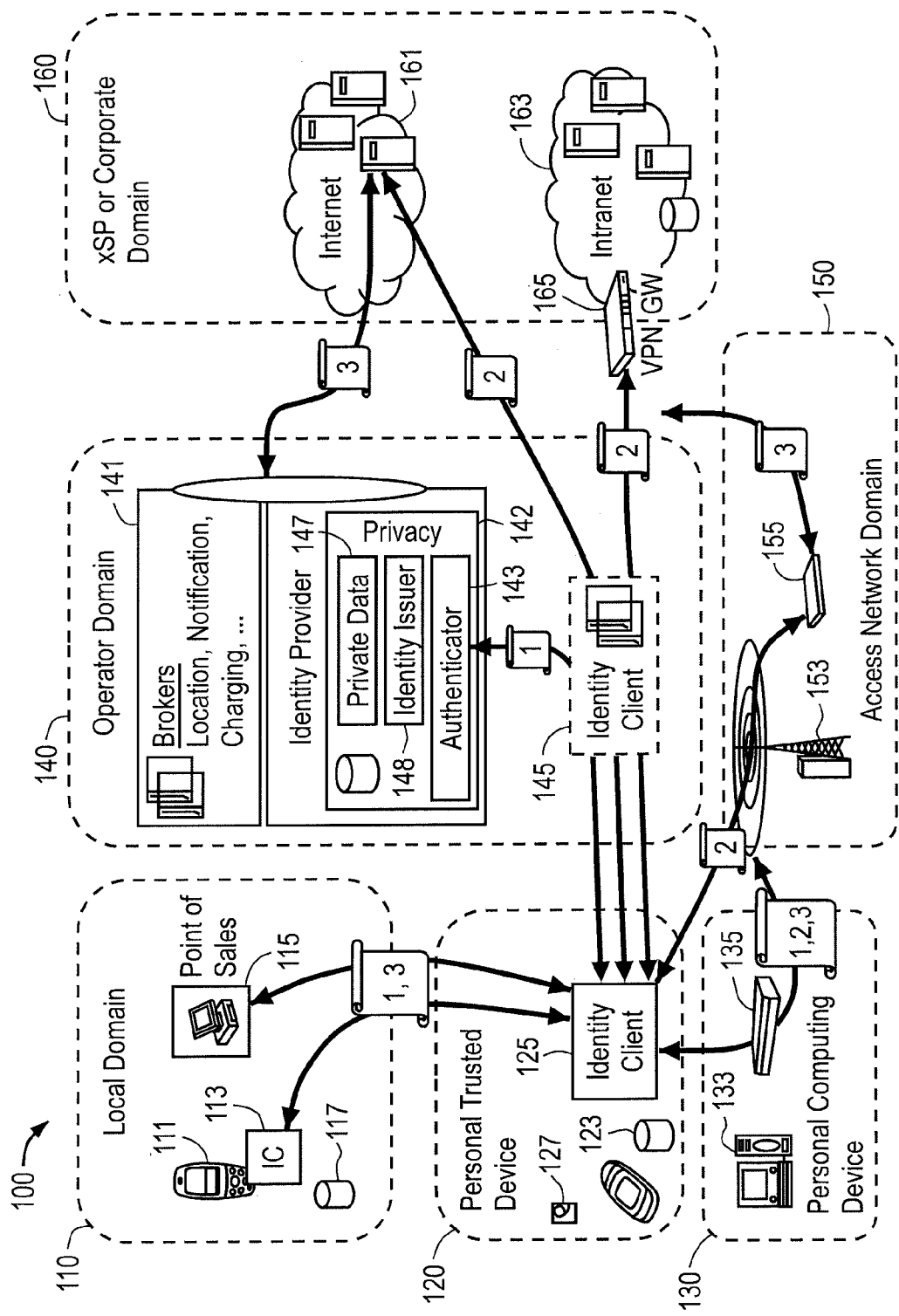
FIG. 4 shows the process of authentication within the Identity System of FIG. 1 in accordance with an embodiment of the invention.

FIG. 4 shows the process of authentication within the Identity System of FIG. 1. The numbers 1, 2, and 3 cited below map to the numbers 1, 2, and 3 in the figure.

1. An Identity (IdentityCard) is issued by Identity Issuer 148 of Identity Provider 142. The Identity may be stored at Identity Provider 142, in an Identity Client 145, or temporarily even in a close-by device in the local domain 110, or in a Personal Computing Device 130, or PTD 120.

2. The identity is presented to a service provider (at xSP, Corporate Domain 160, Point of Sales 115 and the like.) The service provider will be authorized for identity-associated service elements, for instance, to access private data that is associated with the identity. This authorization may be implemented using tickets, where each ticket authorizes the service provider for a particular identity-associated service element.

3. Examples for access of identity-associated service elements:

A service provider in the Internet retrieves private data 147 from the identity provider 142.

The user location may be queried from the network domain 150.

Point of sales 115 charges the user through an identity client.

Figure 5:
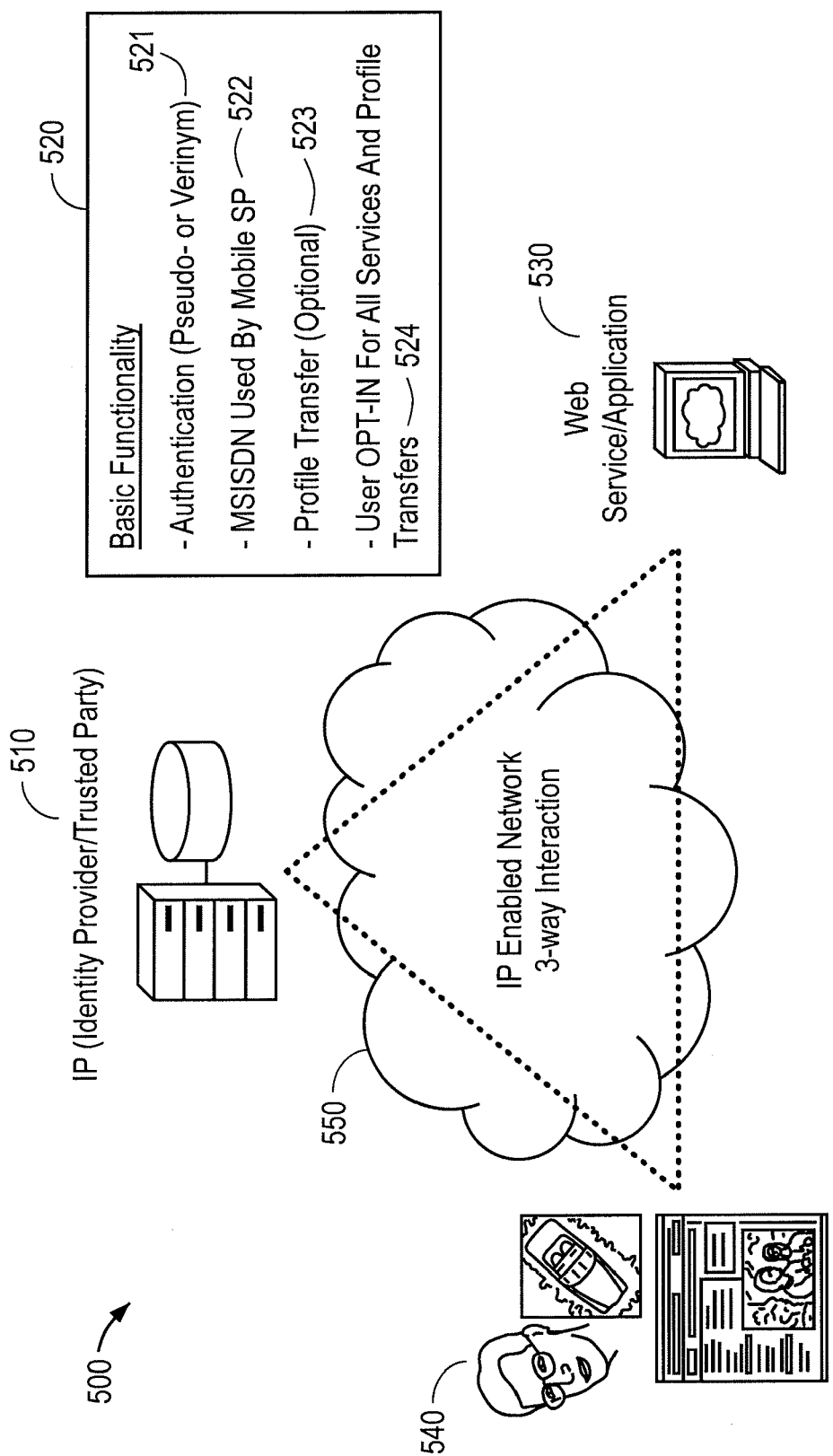
FIG. 5 is illustrative of the relationship between entities in an Identity architecture in accordance with an embodiment of the invention.

FIG. 5 shows an architecture for Identity in accordance with an embodiment of the invention. Identity system in accordance with an embodiment of the invention may operate in an IP enabled Network 550 through a triad 3-way interaction User 540 though a Personal Trusted Device (PTD) accesses Web Services and Applications 530 and is provided with an Identity which said services/applications 530 recognizes. The Identity is provided by an Identity Provider (IP) 510 that in most cases may be a trusted party.

The Identity Provider issues IdentityCards. These IdentityCards enable user authentication, transfer of Private Data (user profile), payments, transactions, signing documents, and other useful services. Each IdentityCard provides a certain level of identification or traceability of a person through the Service Provider: Verinymity, Pseudonymity, or Anonymity.

When the user connects to a service (for instance using the browser) or when he clicks a sign-on logo, the service first sends the user's client a list of accepted IdentityCards or providers of IdentityCards. The user selects an IdentityCard among his IdentityCards, which are also accepted by the service. Given that the service accepts just a specific IdentityCard (for instance for a bank account, for the library, or when you present your personal IdentityCard), the user just chooses to log-on with this card or not. If the user does not have this IdentityCard yet, he might be re-directed to an application form. A new card might also be granted right away for immediate service usage (e.g. by presenting the personal IdentityCard you might be able to open a bank account immediately, and receive the IdentityCard for the bank account).

When the IdentityCard has been presented by the user and accepted by the service, the user uses this service in the name of the specific card. This means that the service may access functionality which belongs to this card (for instance read Private Data for service personalization, use card for payments, let the user digitally sign a contract, etc.). As with today's plastic cards it should be possible to use several cards with the same Service Provider at the same time. For instance you get a discount by presenting a loyalty card at the time of credit card payment.

Private Data gives additional information about the Principal (e.g. mother tongue, gender, age, location) and is associated with an Identity of the Principal. Services may use Private Data for instance for personalisation purpose. Private Data may be distributed to different locations, the user device, the Identity Provider, and the Service Provider.

Single Sign-on (SSO). One of the services provided by the Identity system. SSO minimizes the frequency with which an end user needs to interact with their Identity's authentication mechanism. Without SSO, every time an end user interacts with a user service they must authenticate themselves.

In another embodiment of the invention the trusted party may be associated with an ultra-secure Identity provider. This provider such as FBI, CIA, NSA, FAA or similar government agency. On Oct. 8, 2001 United States President George Bush signed an Executive Order establishing the Office of Homeland Security and the Homeland Security Council. Section 3, subsection (e) clause (v) of the order places protection coordination within the realm of the Office of Homeland Security "coordinate efforts to protect transportation systems within the United States, including railways, highways, shipping, ports and waterways, and airports and civilian aircraft, from terrorist attack;" Thus, a government enitity such as the Office of Homeland Security may provide for a trusted Identity Provider to allow screened individuals to bypass certain security checkpoints since they have already been prescreened.

Aeritas, Inc. (Carrollton, Tex.) has FreedomPass, which is a wireless check-in and security system using voiceprint verification along with a barcode boarding pass linked to a passenger's photo ID. International Publication Number WO 00/74406 Published on Dec. 7, 2000, describes mobile communication unit with Radio Frequency ID (RFID) circuitry and code, which is used to check the authority of an user of travel services. The luggage of the user also has an RFID tag and code so that the luggage may be tracked using RFID.

HTTP REDIRECT for WAP and Web Services Used By Legacy Clients

To support legacy terminals and web browsers in an early phase a solution based upon the HTTP redirect mechanism may be needed. Those legacy clients do not implement a local Identity client, and do not have the necessary Identity support in the protocols. Such an HTTP REDIRECT mechanism shall make use of ISDN based identity assertion, which is commodity in mobile networks. The solution is to have a complete Identity Provider in the network and to use HTTP redirection to direct the client from the service to the Identity Provider. The Identity Provider can then challenge and authenticate the client and select (with or without user intervention) the appropriate Identity. However instead of moving the Identity around via HTTP redirects the Identity Provider will only add a token to the redirection request. The service will receive this token and uses this to pull the Identity directly from the Identity Provider. "Pulling" the Identity allows for the Identity Provider to authenticate the service and to present larger Identities which may contain authorizations. In addition the Identity can be transferred in a much more secure manner. The amount of information that can be passed along in a HTTP redirect is very limited.

Local Client

In this design the Identity client is integrated to the terminal, and various protocol stacks support the local Identity client. X.509 Certificates are used to authenticate services and similar Certificates can be used to represent Identities. For WAP, web and other TCP based services, transport layer security is used to secure exchange of information between the client and the service. Authorizations to use other services are digitally signed by the Identity client using keys provided in X.509 Certificates by those services.

The identity client presents a uniform, user-friendly user interface that supports notifications and is not dependent on the mode of interaction. This is important because these clients do not only support WAP access, but also seamless access to local networks and interaction with the immediate environment including other mobile terminals.

The Identity client integrates flexibly with one or more local, tamper-resistant, secure stores, for Certificates, Private Data and privacy preferences. Practically all new mobile terminals will have a WIM to store crucial Certificates and to sign authorizations. The secure stores can safely be backed up and synchronized with remote stores. The local Private Data is made available not only in Identities, but also as a service for those that present appropriate authorizations.

PKI Based Design

In this design X.509 Certificates store the User's and Services' Identity information and challenge-response protocol following public-key cryptography scheme are used to authenticate parties. Some Service may require client Certificates and these can be supported; in this case authentication is based upon successful setup of secured TLS/SSL connections. In all cases Authorizations to use Brokers are digitally signed by the System using keys provided by the respective Brokers.

There are probably a variety of ways to achieve this, all with pros and cons. Here we first sketch a solution based upon SSL/TLS and record the possible disadvantages in the notes.

Seamless Logon to a Well-Known Service (No Client Certificates)

The User selects a bookmark in his Browser that points to a frequently used Service. As this User has registered with this service the bookmark is to a secure page, i.e. starts with https://. So, the Browser forwards the Request to the Identity Client, that starts the SSL handshake process, i.e. sends encryption algorithm information, etc. to the Service. The Service now responds with normal SSL negotiation, i.e. responds with a Certificate, possible algorithms, etc. The Identity Client receives and verifies the Service Certificate and replies to the Service with the chosen encryption algorithm and a premaster secret encrypted with the public key found in the Server Certificate. The Service derives a session key and replies to the Service that it is ready. The Identity Client also derived its session key and replies that is ready too. Now the Identity Client checks its status to see if it should authenticate the User, let's assume that it should. The Identity Client sends a challenge to the PersonalityNotificationUI.

The NotificationUI prompts the User with the challenge. The User answers the challenge and the NotificationUI responds the User reply to the Identity Client. The Identity Client updates its status to reflect that the User is authenticated. Next, the Identity Client requests the Rule&PolicyStore for Rules and Policies that match the Identity of the Service. The Store responds with a matching Rule. The Identity Client now augments the Request for the (bookmarked page of the) Service with the Identity and associated Credentials of the User as given by the Rule. Finally the Identity Client submits the complete Request over the secure connection to the Service. The Service now verifies the Identity and Credentials. Upon successful verification the Service can fetch the PrivateData that was disclosed by the User as part of the registration process. The Service uses the retrieved PrivateData to personalize the presented content.

In the above, the Identity Client implements the client side of TLS. In another embodiment, the Identity Client may be placed between a Browser and a HTTP/TCP stack provided that the Browser is not too closely integrated with the HTTP client. The Identity Client may act as Proxy.

If the URL would start with another protocol than https:// it may be easier to direct the request through the Identity Client. For example proxy:personality// . . . The actual Browser may now need to know where to direct Requests for URLs that start with this protocol.

From a "purer" perspective all the Identity Client wants is to authenticate the Service and to transfer the User Identity and Credentials securely. A more or less standard PKI server Certificate serves both purposes and TLS is one way to get that Certificate to the Identity Client. A possible alternative embodiment is to have the Service send a HTTP 401 "Unauthorized" response and instead of, or in addition to, the "WWW-Authenticate" header, add the Service Certificate to the body of the HTTP response. This would mean an extension of HTTP authentication. The Identity Client again verifies the Certificate and uses the public key in the Certificate to encrypt User Identity and Credentials. This is probably more secure than currently used HTTP authentication yet seems simple and effective otherwise.

The Service will probably want to set a cookie to maintain the session. Should check if cookies are only specified for a realm, not for protocol. I.e. the cookie was set a response to the https:// . . . , the same cookie should be submitted when accessing subsequent pages through links starting with plain http:// . . . Otherwise all access to the service has to be secure and this may be to expensive (on the Service side). If cookies cannot be used URL rewriting can do the job adequately.

The Identity Client may add some PrivateData and/or Authorizations to the Request as determined by the Rule or other Policies.

Anonymous Access to a Personalizing Service

The User selects a link in his Browser that points to a Service. The Browser forwards the Request to the Identity Client. The Identity Client does not interfere with normal HTTP Requests and forwards the Request to the Service, as is. The Service however would like to personalize the content, and therefore responds with a request for PrivateData, this is indicated by a HTTP status code (e.g. 401) and a HTTP header.

The response body contains details about the requested data and a Service Certificate. The Identity Client, intercepts this Response and verifies the Server Certificate. Next the Identity Client requests the Rule&PolicyStore for Rules and Policies that match the Identity of the Service. This time presume that the Store responds with Nothing. The Identity Client now sends a User Permission Request to the PersonalityNotificationUI. The NotificationUI present the user with details about the requested PrivateData and allows the user to select what PrivateData to provide and how to handle future requests from this Service. The NotificationUI sends the User choices to the Identity Client. In case the User allowed automatic provision during subsequent visits, the Identity Client creates and stores a new Rule. The Identity Client now creates a new Request for the (bookmarked page of the) Service augmented with the PrivateData that the user chose to disclose. The PrivateData is encrypted with the public key of the Certificate. Finally the Identity Client submits the complete Request to the Service. The Service now recognizes the PrivateData and uses it to personalize the presented content.

Note that the service never got an Identity of the User, therefore it can not store PrivateData for future use, it can only do statistics on the data. The Service also has no way to inform the User in case it does something with the disclosed data, unless the Identity Client provided a notification Authorization.

The Service could ask for and/or the Identity Client could provide (with Users consent) Authorizations for Brokers, for example for location.

Seamless logon to a well-known service that requires a User Certificate

The User selects a bookmark in his Browser that points to a frequently used Service. As this User has registered with this service the bookmark is to a secure page, i.e. starts with https://. So, the Browser forwards the Request to the Identity Client, which starts the SSL handshake process, i.e. sends encryption algorithm information, etc. to the Service. The Service now starts normal SSL negotiation, i.e. responds with a Server Certificate, possible algorithms, a request for a Client Certificate and possibly a list of Certification Authorities that it recognizes. The Identity Client receives and verifies the Service Certificate. Next the Identity Client checks its status to see if it should authenticate the User, let's assume that it the user was already authenticated, meaning that the Identity Client can access the Store. So, the Identity Client requests the Rule&PolicyStore for Rules and Policies that match the Identity of the Service. The Store responds with a matching Rule. The Rule points to a Client Certificate. The Identity Client replies to the Service with the Certificate, a signature, the chosen encryption algorithm and a premaster secret encrypted with the public key of the User Certificate. The Service derives a session key and replies to the Identity Client that it is ready. The Identity Client also derived its session key and replies that is ready too.

Now the Identity Client submits the original HTTP Request. The (actual) Service now has another opportunity to verify some fields that were in the Client Certificate, for example some Identity and Credentials. Upon successful verification the Service can fetch the PrivateData that was disclosed by the User as part of the registration process. The Service uses the retrieved PrivateData to personalize the presented content.

This Use Case shows how Client Certificates could be integrated in the solution. Client Certificates are fine as long as the Certificates are Service specific, i.e. one Certificate per Service. If a single Certificate is used to present the User to a number of Services the User becomes rather tractable.

Use Case Scenarios

This section presents a number of scenarios where an Identity system in accordance with embodiments of the present invention enables an improved user experience. Interleaved (within the "story") are brief definitions in generic, but more technical terms, that serve as titles for Use Cases-these are between the Bra< (left-bracket) and the Ket> (right bracket). This "story" is provided as an examplar of the identity System of embodiments of the invention and is not to be regarded as limiting the scope of the invention.

Joe Jackson likes Spanish guitar music and regularly visits concerts of various artists. He has planned to go to the opening concert of the new world tour of the "Six Strings", to be held in Madrid, next month. During a coffee break at work he surfs to the "Blue Air" website to reserve a flight. As Joe is at work he was logged into the corporate intranet. <Authentication of Principal to Identity Provider, corporate is Identity Issuer and Authenticator>. Hence the system is pretty sure about Joe's Identity and presents "Blue Air" with Joe's frequent flyer number and Joe's password (for Blue Air). <Seamless Login, the Identity Client submits Service specific Credentials on behalf of the Principal>. Joe has entered these Credentials into the system earlier. The "Blue Air" service doesn't need to present a login page, and shows a page personalized for Joe. "Blue Air" knows about Joe's interest in Spain and therefore highlights a special offer for a long weekend trip to Barcelona. Joe considers to take up on the offer and to rent a car, but decides that it probably takes too much time to drive. He wants to find out about flights to Madrid. He does a search on the site for flights to Madrid. The "Blue Air" site list some flights and indicates that Joe could have one of the flights very cheap, if he is ready to use 10000 of his frequent-flyer points. Service presents personalized content on basis of PrivateData previously disclosed by Principal. This offer is irresistible so Joe makes a reservation. He indicates that he will pay for the ticket at the check in-desk at the airport. The "Blue Air" website adds the flight into Joe's calendar. It could do so as Joe has allowed the system to grant a one-time-right to add an appointment each time he visits a trusted site such as "Blue Air". <Identity Client issued Authorization Ticket for particular Secondary Service (Broker) to primary Service>.

Very pleased with the upcoming trip to the concert he now surfs to the web site of "Six Strings", here is a link to "Red Productions", the organizer of the concert where one can reserve tickets. To reserve a ticket "Red Productions" requires a recognized Identity. <Service requires that Principal present a traceable Identity, verifiable by a recognized Authenticator>. The "Red Productions" site accepts MS Passport, a VISA credit card number and address, or a Liberty Identity from some big operators and corporations. Joe is lucky as he works for Nokia, one of the sponsors of the concert, and a Liberty Authenticator recognized by Red Productions. So Joe can select the Liberty logo on the page. The Identity Client on his PC (or on his terminal?) pops up and asks if it is OK for the system to submit a traceable Nokia Identity to Red Productions. Joe accepts, as he trusts that the Nokia Identity Provider will not reveal his real Identity or any other Private Data. Red Productions meanwhile has assurance that there is a real, traceable, person behind this browsing session. That person can be allowed to reserve a sensible number of tickets. <Single-Sign-On, Principals authentication with Identity Provider is trusted by Service>. Red Productions does not care about Joe's name, address, etc., but does need payment for the ticket. The "Red Productions" site also offers a 5% discount if Joe chooses to register his e-mail address and accept that the site will send approx. once per month an e-mail with advertisements for concerts and records. Joe clicks on the "Opt-In" button and now his mobile terminal beeps and asks for permission to provide his e-mail, home address, phone number and music preferences to "Red Productions". Joe decides to accept but unticks home address and phone number. <Principal discloses PrivateData with non-reputable consent>. The system told "Red Productions" that Joe prefers to pay with his mobile Wallet, and actually provided an authorization to send a payment request to Joe's terminal. The Red Productions sends a receipt together with the authorization to the notification server (which address was attached to the authorization). <Service uses Authorization Ticket for Broker>. Joe's mobile phone beeps and asks him to digitally sign the payment for the ticket. Joe signs and his mobile Wallet receives a receipt. <MCommerce transaction>. His mobile Wallet actually also added the RF number of his terminal to the signed message, this will later help Joe to get inside the concert hall.

Now Joe only needs to reserve a hotel. He should really continue his work now, especially since he will soon take a few days off. So he quickly surfs to "Hotels Unlimited", a site he has used every now and then for business trips. He has configured his system to authorize "Hotels Unlimted" to read "appointments abroad" from his calendar. Again the system knows how to login Joe to "Hotels Unlimited" and hence "Hotels Unlimited" presents a page with a couple of hotels in Madrid according to Joe's preferences. The very fact that "Hotels Unlimited" does this is the major reason Joe uses this site even though some friends try to tell him that other sites offer slightly lower hotel prices. "Hotels Unlimited" also knows about Joe's preference for Spanish guitar music and guesses that Joe might be going to the "Six Strings" concert. So it lists hotels near the concert venue first. Joe confirms the first hotel. As Nokia uses "Hotels Unlimited" regularly and Joe was recognized as authenticated by Nokia he does not have to pay a reservation sum. "Hotels Unlimited" sends an e-mail message with the address and other details of the hotel, including a reservation number. If Joe would have thought of setting his notification preferences for this service, "Hotels Unlimited" would have send him the details and map by MMS right to his mobile phone ready for use in Madrid. Joe has now finished his coffee and goes back to work . . . .

Today Joe works a little longer as he has agreed to see a movie with a friend and decided that he will not go home before the movie. On his way to the movie theater he passes a newly opened music shop. He decided to browse a bit in there, you never know . . . This new shop has a Bluetooth system with a Liberty service. When Joe enters the shop the system recognizes that his terminal has a Liberty Identity Client and asks for music preferences. Joe has configured his terminal to inform any Liberty compliant system his music preference for "Spanish guitar", as long as his other Identity information (name, address, etc) is not provided. <Anonymous disclosure of PrivateData to Proximity>. The shop system sends a map to Joe's terminal that shows him the aisle for all "world music". Joe laughs in himself about such a system, and wonder how many engineers spent long nights to make this work, but nevertheless walks over to the indicated aisle.

In the aisle he finds some of his favorites but also some new groups that he hasn't heard about before. Above the bench with records are instructions that tell Joe that this shop has a Digital Rights Management system that enables people with supported mobile devices to pre-listen to records on their own device. Joe likes gadgets and recently bought such a new mobile phone, and decides to try this. He only needs to swipe his phone and then the (empty) CD box by a pad. His new phone beeps and asks if it is ok to download the first two songs of the album. Joe accepts and in no time the songs are in his phone together with a DRM voucher good for listening to these songs three times. Joe listens to the first song once, but isn't too impressed and should go to the movie theater anyway, so leaves the shop. After the movie he tells his friend about his new mobile and the experience in the music shop. His friend tells him that that he likes that record very much and recommends it to Joe. Later at home Joe listens to both songs and now starts to like the music. He listens a third time and really likes it. He has now used his DRM voucher and his terminal offers to buy a new permanent voucher for the entire album. Joe accepts this (signs) and the terminal connects to the music shop site, submits a payment authorisation and receives the voucher. Joe now has the full voucher in his terminal, but not yet the music itself, except those first two songs. Next morning at work the Bluetooth environment recognizes Joe's terminal, and the terminal's outstanding request for the music album. <Disclosure of PrivateData to Trusted Service in Proximity>. The download server at work fetches the music and transmits it to Joe's terminal. Once completed the terminal simply shows an icon that new music is available.

Two weeks later Joe leaves for his trip. At the airport he goes directly to check-in. Joe tells about his eReservation and shows his passport, as this is required by the airlines. The agent says that all is OK and notices on his monitor that Joe prefers to pay by mobile credit card. The agent presses a button and the airline system sends a receipt by Bluetooth to his terminal. Joe signs with his PIN code and the terminal sends the authorisation to the airline check-in system. <MCommerce transaction with Service in Proximity>. The agent now prints out a boarding pass.

Joe now has some time to spend at the airport and he decides to check for some updated documents in his e-mail. The airport authority operates a WiFi LAN so Joe activates the WiFi transceiver is his new phone. The LAN recognizes his phone and asks for identification. The phone prompts Joe to ask which Identity to use, as the LAN recognizes Identities issued by major operators (including Joe's) as well as some corporates (including Nokia) and major credit cards. Joe selects his Nokia Identity, as his needs are work-related. <Login to a non-HTP Service>. He launches his e-mail client which is set up to connect to the Nokia VPN access point. The access point needs Identity too but only accepts Nokia issued Identities, so his phone doesn't need to ask Joe what Identity to use. However, for added security Nokia requires verynimity and hence the phone prompts Joe to place his thumb and index finger to the sides of the phone. The phone transmits Joe's fingerprint as credential to the VPN access point, which now accepts Joe's VPN session. <Biometric challenge to establish verynimity>. Once in Madrid and in the concert arena he notes that there are dedicated queues for people with electronic ticketing devices. Joe lines up with one of those short queues, not sure that it will work for him, but willing to give it a try as he remembers paying for the ticket from his mobile Wallet. To Joe's surprise he only needs to swipe his phone over a pad and the port is opened . . . <Device ID recognized and accepted by Service in Proximity>.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. An apparatus, comprising:
at least one processor; and
at least one memory, wherein the at least one processor and the at least one processor provide operations comprising:
storing one or more virtual identity cards comprising a plurality of identities for a user with associated functionality, wherein at least two of the identities have different nymity levels, wherein the nymity levels comprise a verinym including an identity traced to the user, a pseudonym including a persistent fictitious name, and an unlinkable anonymity, wherein the verinym identifies the user by a verinym name or associated private data, wherein the one or more virtual identity cards further comprise one or more credentials and the associated private data to enable personalization to a service provider, and wherein a mobile operator provides at least one of the pluralities of identities;
selecting a virtual identity card from the one or more virtual identity cards based on a nymity level corresponding to the nymity level required by a physical service card for a transaction at the service provider for the transaction; and
accessing and operating on functionality associated with the selected virtual identity card, wherein
the user is enabled to securely use the selected virtual identity card for the transaction at the service provider for the transaction.

2. The apparatus of claim 1, wherein the mobile operator provides authentication of at least one of the pluralities of identities, wherein the identities are in the form of physical identification modules, and the apparatus further comprises: a display for displaying information regarding the modules; a keyboard for data entry; and
a local processor for processing functionality associated with at least one of the plurality of identities.

3. The apparatus of claim 1, further comprising: maintaining history information for at least one of the plurality of identities.

4. A method, comprising:
storing one or more virtual identity cards comprising a plurality of identities for a user with associated functionality, wherein at least two of the identities have different nymity levels, wherein the nymity levels comprise a verinym including an identity traced to the user, a pseudonym including a persistent fictitious name, and an unlinkable anonymity, wherein the verinym identifies the user by a verinym name or associated private data, and wherein the one or more virtual identity cards further comprise one or more credentials and the associated private data to enable personalization to a service provider;
selecting a virtual identity card from the one or more virtual identity cards based on a nymity level corresponding to the nymity level required by a physical service card for a transaction at the service provider for the transaction; and
accessing and operating on functionality associated with the selected virtual identity card, wherein the user is enabled to securely use the selected virtual identity card for the transaction at the service provider for the transaction.

5. The method of claim 4, further comprising logging on, wherein the logging on to a service of the service provider comprises:
- completing an application form;
- being granted an identity;
- logging on to the system; and
- associating the granted identity with other identities of the user.

6. The method of claim 4, further comprising generating a list of the at least one of the plurality of identities.

7. The method of claim 4, further comprising:
- automatically presenting a second identity that has been associated with the first identity.

8. The method of claim 4, wherein the verinym comprises at least one of a credit card number, a telephone number, a street address, and an e-mail address.

9. The method of claim 4, further comprising:
- maintaining history information about the usage of the identity.

10. A non-transitory computer program embodied on a computer readable storage medium, the computer program being configured to control a processor to perform a process, the process comprising:
- storing one or more virtual identity cards comprising a plurality of identities for a user with associated functionality, wherein at least two of the identities have different nymity levels, wherein the nymity levels comprise a verinym including an identity traced to the user, a pseudonym including a persistent fictitious name, and an unlinkable anonymity, wherein the verinym identifies the user by a verinym name or associated private data, and wherein the one or more virtual identity cards further comprise one or more credentials and the associated private data to enable personalization to a service provider;
- selecting a virtual identity card from the one or more virtual identity cards based on a nymity level corresponding to the nymity level required by a physical service card for a transaction at the service provider for the transaction; and
- accessing and operating on functionality associated with the selected virtual identity card, wherein the user is enabled to securely use the selected virtual identity card for the transaction at the service provider for the transaction.

11. The computer program of claim 10, further comprising logging on to a service of a service provider, wherein the logging further comprises:
- completing an application form;
- being granted an identity;
- logging on to the system; and
- associating the granted identity with other identities of the user.

12. The computer program of claim 10, the process further comprising:
- automatically presenting a second identity that has been associated with the first identity.

* * * * *